US010432873B2

(12) United States Patent
Matsuhashi et al.

(10) Patent No.: US 10,432,873 B2
(45) Date of Patent: Oct. 1, 2019

(54) IMAGING APPARATUS AND IMAGING METHOD FOR CONCURRENTLY ACQUIRING STILL IMAGES AND VIDEO

(71) Applicant: OLYMPUS CORPORATION, Hachioji-shi, Tokyo (JP)

(72) Inventors: Takayuki Matsuhashi, Hino (JP); Ryosuke Mochizuki, Hachioji (JP); Mika Muto, Tachikawa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/797,514

(22) Filed: Oct. 30, 2017

(65) Prior Publication Data

US 2018/0124297 A1 May 3, 2018

(30) Foreign Application Priority Data

Oct. 31, 2016 (JP) ................................ 2016-213049

(51) Int. Cl.
*H04N 5/235* (2006.01)
*H04N 5/232* (2006.01)

(52) U.S. Cl.
CPC ....... *H04N 5/2353* (2013.01); *H04N 5/23229* (2013.01); *H04N 5/23245* (2013.01); *H04N 5/23258* (2013.01)

(58) Field of Classification Search
CPC ............ H04N 5/2353; H04N 5/23245; H04N 5/23229; H04N 5/23258
See application file for complete search history.

(56) References Cited

U.S. PATENT DOCUMENTS 7,162,102 B2 * 1/2007 Cahill ....................... G06T 3/00 382/284
8,363,121 B2 * 1/2013 Maeng .................. H04N 5/232 348/208.1
8,982,242 B2 * 3/2015 Toyoda ............. H04N 5/23277 348/222.1
9,017,163 B2 * 4/2015 Newhouse ............. G06F 3/011 463/31
2016/0337577 A1 * 11/2016 Hisamoto .......... H04N 5/23212

FOREIGN PATENT DOCUMENTS

JP 2016-032214 A 3/2016

* cited by examiner

*Primary Examiner* — Padma Haliyur
(74) *Attorney, Agent, or Firm* — Volpe and Koenig, P.C.

(57) ABSTRACT

An imaging apparatus includes an imaging unit configured to generate an image at each of predetermined timings, wherein an exposure time is used at each of predetermined timings. The imaging apparatus includes at least one circuit which divides, according to whether or not a specific photography situation occurs, the exposure time, into a plurality of exposure times including a first exposure time for acquiring still image and a second exposure time for acquiring movie; and generates a still image, based on an image generated by photography with the first exposure time, and generates a movie frame constituting a movie, by using an image generated by photography with the second exposure time.

13 Claims, 12 Drawing Sheets

I1
O1
I4
O1
I3
O1
I2
O1

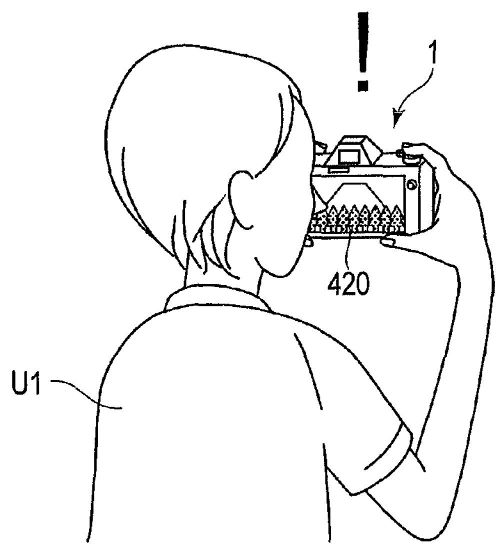
F I G. 2A
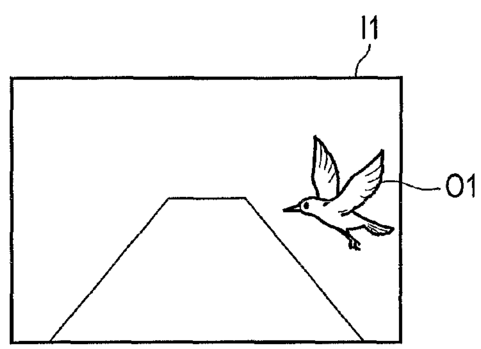
F I G. 2B

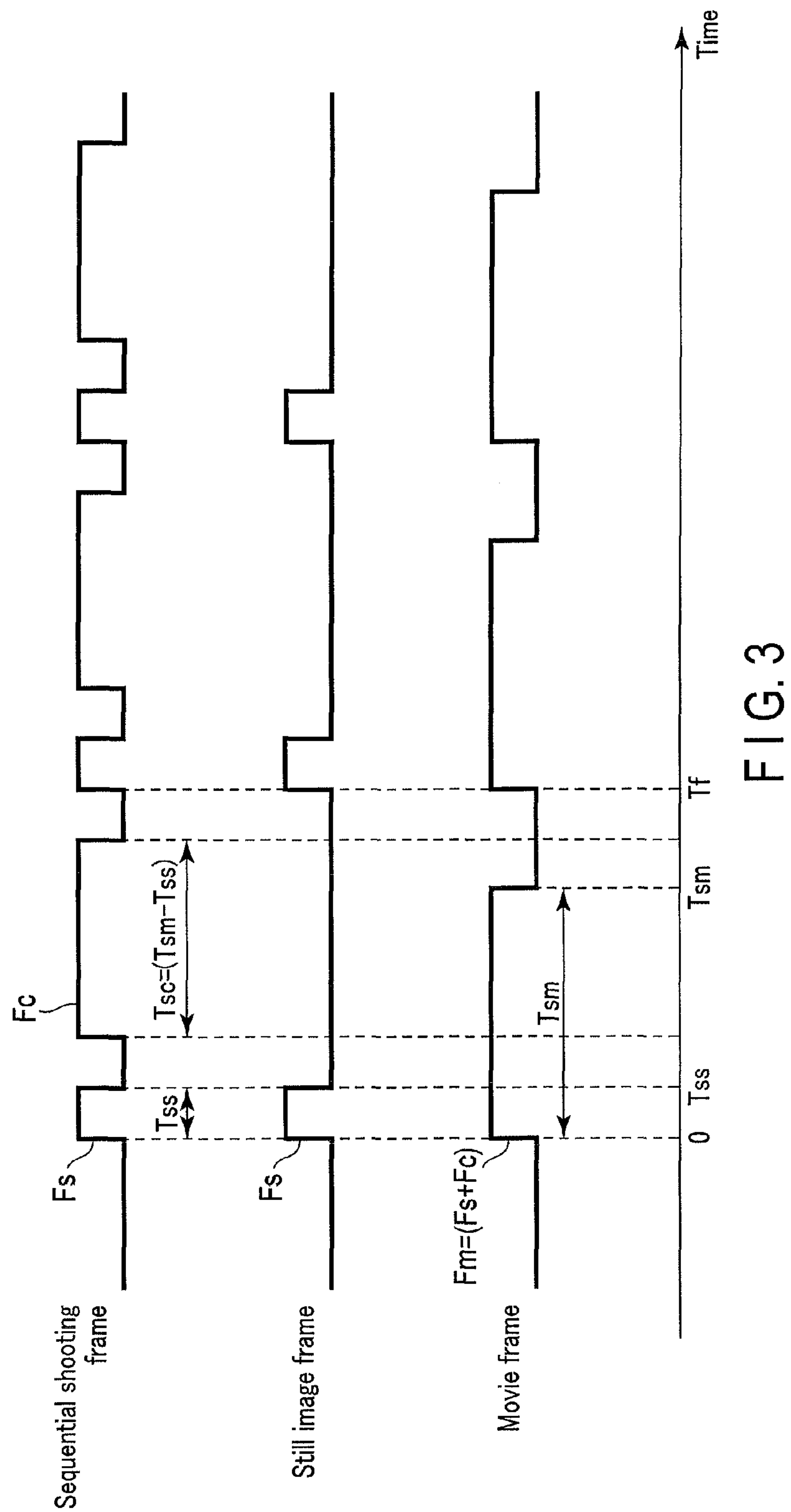
F I G. 3

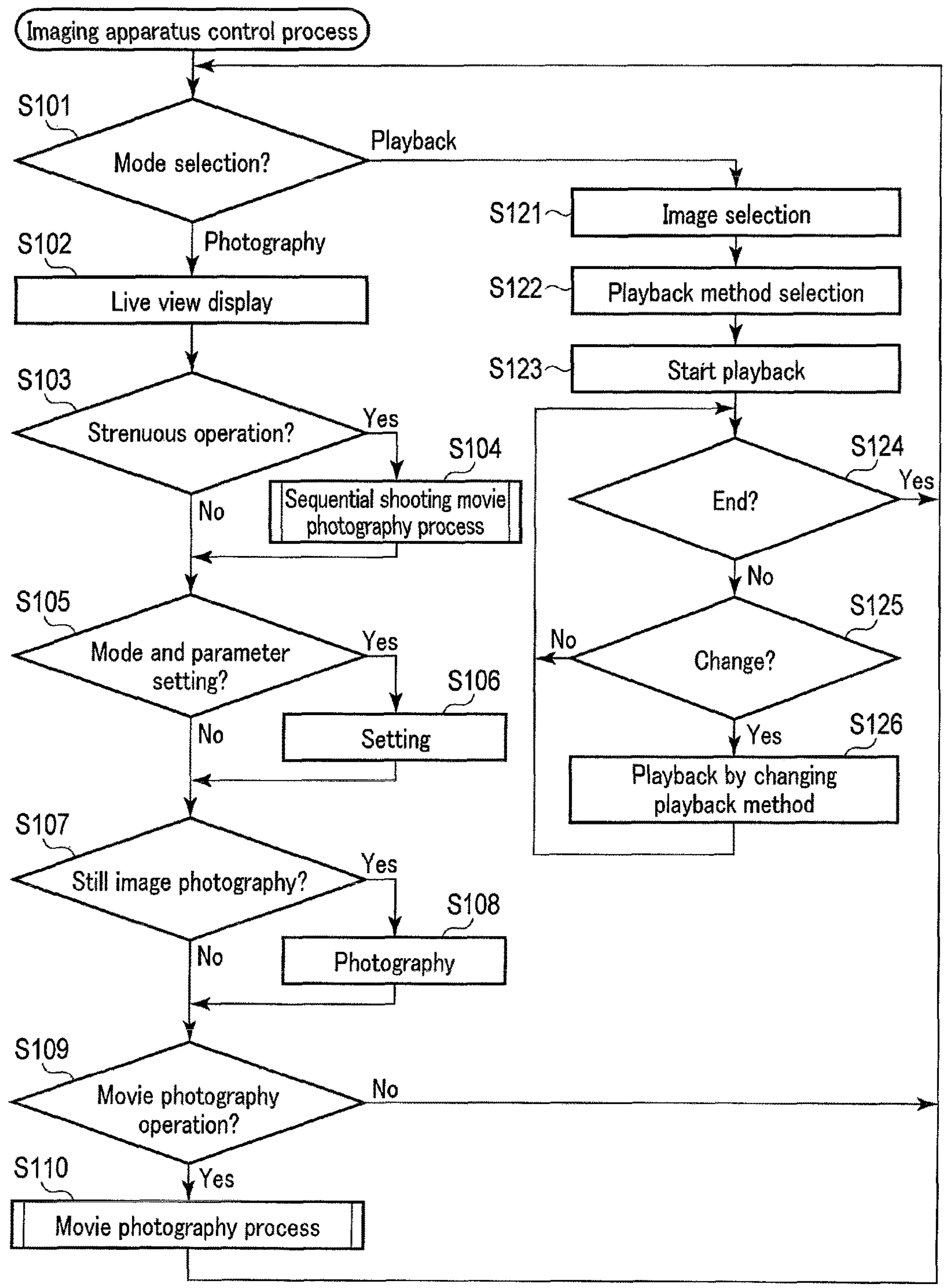
F I G. 4

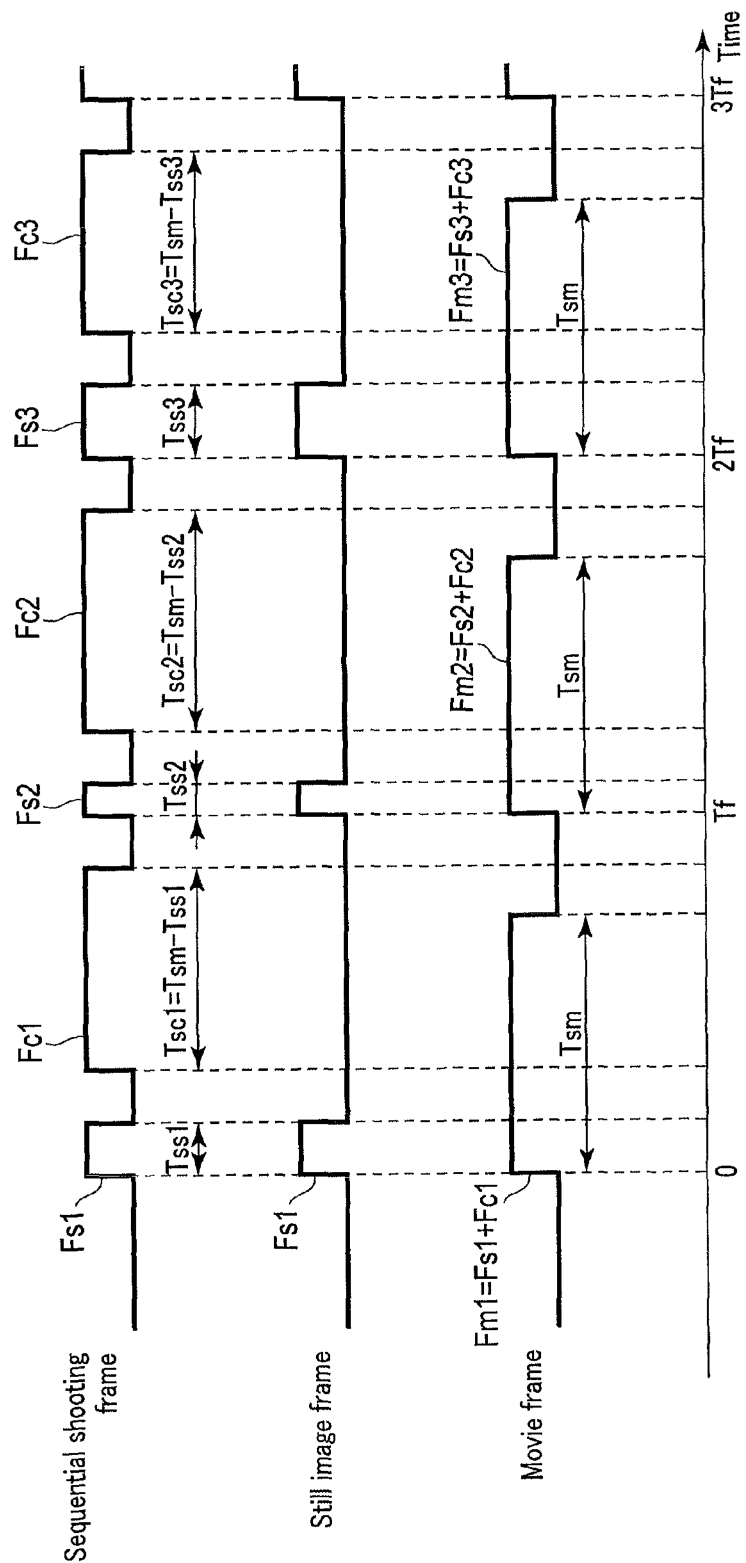
F I G. 6

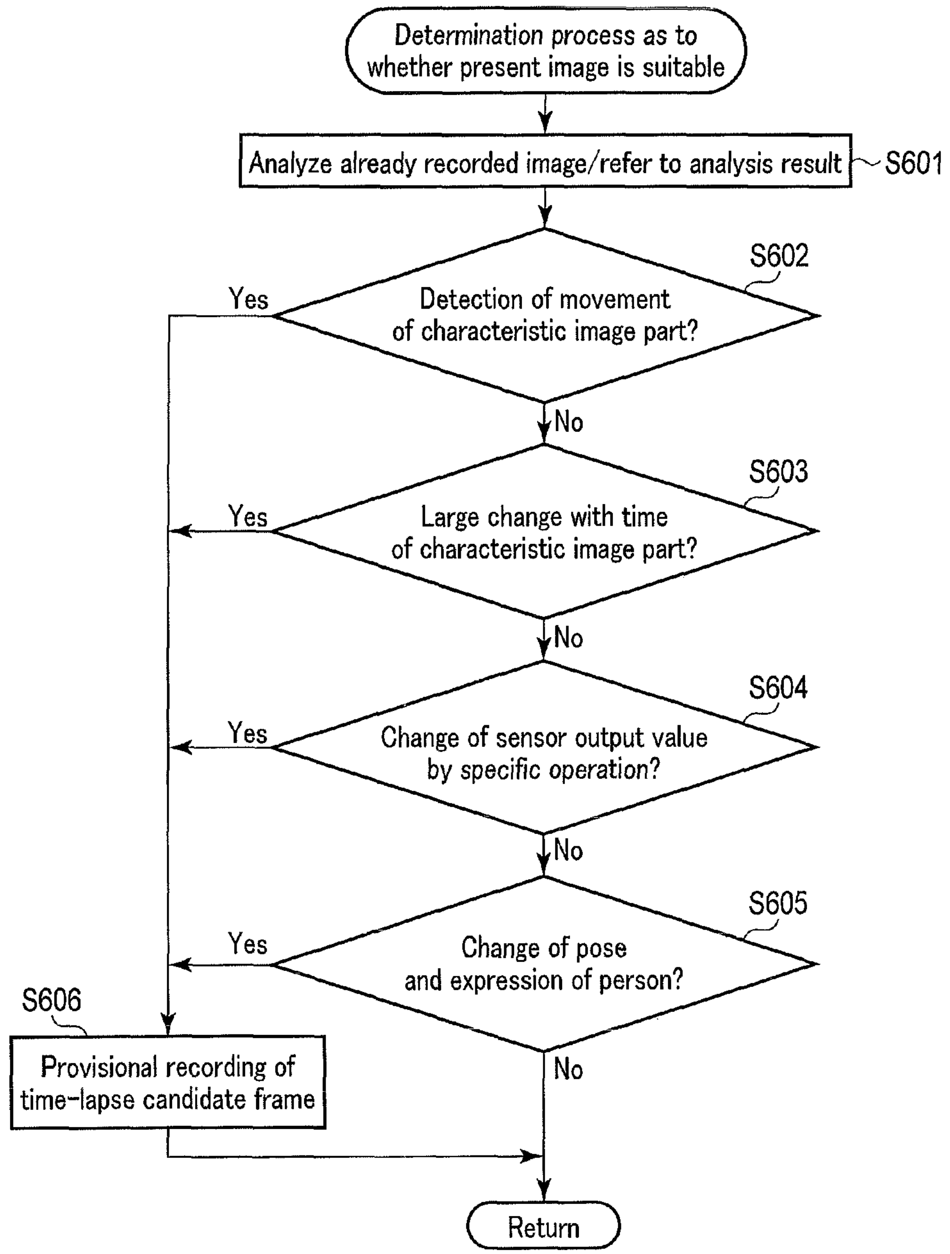
F I G. 10

IMAGING APPARATUS AND IMAGING METHOD FOR CONCURRENTLY ACQUIRING STILL IMAGES AND VIDEO

CROSS-REFERENCE TO RELATED APPLICATIONS

This application is based upon and claims the benefit of priority from the prior Japanese Patent Application No. 2016-213049, filed Oct. 31, 2016, the entire contents of which are incorporated herein by references.

BACKGROUND OF THE INVENTION

1. Field of the Invention

The present invention relates to an imaging apparatus and an imaging method.

2. Description of the Related Art

In recent years, the quality of a movie has been improved from Hi-Vision image quality, to 4K image quality, and to 8K image quality. It is expected in the future that each of images constituting a movie, in other words, each of movie frames, will have an image quality which is substantially equal to the image quality of a conventional still image. In addition, there is a demand for acquiring a still image from a captured movie. For example, when a subject that is a desired target of photography suddenly appears, a movie is quickly captured, and afterwards a scene including the subject that is the desired target of photography, is extracted from the movie and acquired as a still image. For example, Jpn. Pat. Appln. KOKAI Publication No. 2016-32214 discloses a technique relating to an imaging apparatus having a movie photography mode for acquiring a movie which is composed of images suitable for still images.

In general, characteristics that are required for image quality are different between each of movie frames in the movie and an image in the still image. For example, in the movie, images are sequentially displayed at a predetermined frame rate. Thus, in each of the images constituting the movie, a natural connection with preceding and following images, rather than the level of completion such as a less conspicuous blur, is considered important, and is required. Accordingly, it is better for the images for the movie to have a certain degree of blur. On the other hand, for example, in the case of a still image, an image that constitutes the still image is continuously displayed. Thus, in each of the images constituting the still images, having a high level of completion as a single image, such as a less conspicuous blur, is considered important and is required. Also in the case of a time-lapse movie that is composed of still images that are acquired at specific time intervals, the same characteristics as with each of the images that constitute the still images are required for each of the images that constitute a time-lapse movie. In this manner, for example, in the movie which is composed of images having characteristics suitable for still images, it is possible that the connection between individual movie frames is not smooth, and that the movie cannot be suitably appreciated. Similarly, if a still image is extracted from the images suitable for a movie, it is possible that the image quality of this image as a still image is low.

BRIEF SUMMARY OF THE INVENTION

According to one embodiment of the present invention, an imaging apparatus comprising an imaging unit configured to generate an image at each of predetermined timings, wherein an exposure time is used at each of predetermined timings; at least one circuit configured to divide, according to whether or not a specific photography situation occurs, an exposure time, into a plurality of exposure times including a first exposure time for acquiring still image and a second exposure time for acquiring movie, to generate a still image, based on an image generated by photography with the first exposure time, and to generate a movie frame constituting a movie, by using an image generated by photography with the second exposure time.

According to another embodiment of the present invention, a imaging method comprising generating an image by imaging at each of predetermined timings, wherein an exposure time is used at each of predetermined timings; dividing, according to whether or not a specific photography situation occurs, an exposure time, into a plurality of exposure times including a first exposure time for acquiring still image and a second exposure time for acquiring movie, generating a still image, based on an image generated by photography with the first exposure time, and generating a movie frame constituting a movie, by using an image generated by photography with the second exposure time.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute apart of the specification, illustrate embodiments of the invention, and together with the general description given above and the detailed description of the embodiments given below, serve to explain the principles of the invention.

FIG. 2A is a view illustrating an example of a state on photography using the imaging apparatus according to the first embodiment.

FIG. 2B is a view illustrating an example of the relationship between a composition and a subject on photography according to the first embodiment.

FIG. 3 is a timing chart illustrating an example of the relationship between respective images in sequential shooting movie photography and exposure time according to the first embodiment.

FIG. 4 is a flowchart illustrating an example of an imaging apparatus control process according to the first embodiment.

FIG. 6 is a timing chart illustrating an example of the relationship between respective images in a sequential shooting movie photography process and exposure time according to a second embodiment.

FIG. 10 is a flowchart illustrating an example of a determination process of determining whether or not a present image is suitable, according to the fourth embodiment.

DETAILED DESCRIPTION OF THE INVENTION

[First Embodiment]

<Configuration of Imaging Apparatus>

Figure 1:
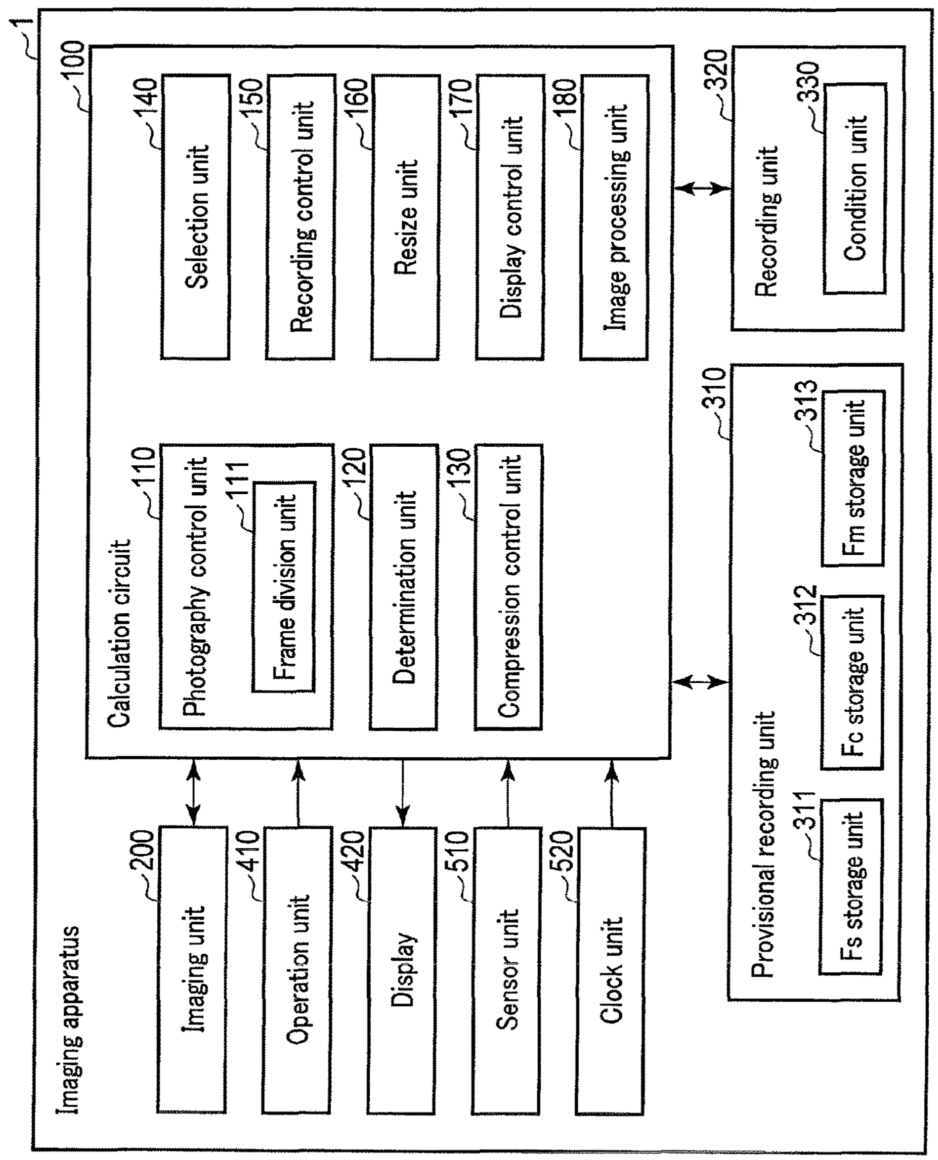
FIG. 1 is a block diagram which schematically illustrates an exemplary configuration of an imaging apparatus according to a first embodiment.

FIG. 1 schematically illustrates an exemplary configuration of an imaging apparatus 1 according to a first embodiment of the present invention. Referring to FIG. 1, the configuration of the imaging apparatus 1 according to the present embodiment will be described.

The imaging apparatus 1 includes a calculation circuit 100 and an imaging unit 200. The calculation circuit 100 mainly executes control of respective components of the imaging apparatus 1, and executes image processing. The calculation circuit 100 includes a photography control unit 110 and an image processing unit 180. The photography control unit 110 executes, for example, control relating to settings of a frame rate of a movie, a photography mode, parameters, etc., and control relating to photography. The photography control unit 110 includes a frame division unit 111. The frame division unit 111 sets, for example, a plurality of shutter speeds corresponding to purposes of photography, and causes the imaging unit 200 to execute imaging at the shutter speeds. Specifically, the frame division unit 111 sets a plurality of exposure times corresponding to purposes of imaging, and causes the imaging unit 200 to execute imaging with the exposure times. Thus, each shutter speed in the present embodiment may be read as each exposure time. The image processing unit 180 generates a still image and a movie, for example, based on images acquired by the imaging unit 200. In addition, the image processing unit 180 subjects each image to image processing which is appropriate for the purpose of use of the image. The imaging unit 200 includes, for example, an imaging optical system and an image sensor. The imaging unit 200 generates image data, based on an image which is formed on an imaging plane of the image sensor via the imaging optical system. The imaging optical system includes, for example, a zoom optical system which can change a focal distance. The imaging unit 200 generates an image at each of predetermined timings. The predetermined timing may be, for example, a preset photography interval, or a photography interval which is determined based on a user's operation. For example, the preset photography interval includes a frame rate in movie photography, a photography interval in sequential shooting, etc.

The calculation circuit 100 further includes a determination unit 120, a compression control unit 130, a selection unit 140, a recording control unit 150, a resize unit 160, and a display control unit 170.

The determination unit 120 executes, for example, determination relating to the operation of the imaging apparatus 1. This determination includes, for example, determination as to whether or not to execute a sequential shooting movie photography process to be described later. The compression control unit 130 executes, for example, compression of movie data. The compression control unit 130 may determine a format of compression, based on which the movie data is compressed. Furthermore, the compression control unit 130 may execute, for example, compression relating to still images and sound, which are acquired by still image photography, and may perform processes, such as frame skipping, division, deletion and coupling, on the movie data. The selection unit 140 determines, for example, which of the still images or movie acquired in accordance with the user's operation is to be recorded or deleted. The recording control unit 150 relates to the operation of recording or storage in the imaging apparatus 1. The resize unit 160 mainly executes a resize process of images. The resize unit 160 may include the compression control unit 130 and may execute compression of a movie, or the resize unit 160 may be included in the compression control unit 130. The display control unit 170 generates display information for display on a display 420 to be described later. This display information includes, for example, information relating to display for a user's operation.

The calculation circuit 100, or each of elements included in the calculation circuit 100, includes an integrated circuit or the like, such as a central processing unit (CPU), an application specific integrated circuit (ASIC), a field programmable gate array (FPGA), a digital signal processor (DSP), or a graphics processing unit (GPU). The calculation circuit 100, or each of elements included in the calculation circuit 100, may be composed of one integrated circuit or the like, or may be composed of a combination of a plurality of integrated circuits or the like. Two or more of the elements included in the calculation circuit 100 may be composed of one integrated circuit. The operations of these integrated circuits or the like are executed according to programs which are recorded, for example, on a recording unit 320, or on a recording area which the integrated circuit or the like includes therein.

The imaging apparatus 1 further includes a provisional recording unit 310, the recording unit 320, an operation unit 410, a display 420, a sensor unit 510 and a clock unit 520.

The provisional recording unit 310 temporarily stores information including acquired images. The provisional recording unit 310 includes an Fs storage unit 311, an Fc storage unit 312, and an Fm storage unit 313. Of the images that the provisional recording unit 310 stores, the Fs storage unit 311 stores images to be used for generating still images, the Fc storage unit 312 stores images to be used for generating a movie, and the Fm storage unit 313 stores images constituting the generated movie, together with information relating to each of the images. The provisional recording unit 310 is, for example, a volatile memory such as a static random access memory (SRAM) or a dynamic random access memory (DRAM), but the provisional recording unit 310 may be a nonvolatile memory such as a flash memory. Each of the provisional recording unit 310 and the elements included in the provisional recording unit 310 may be composed of one memory or the like, or may be composed of a combination of a plurality of memories or the like. Two or more of the elements included in the provisional recording unit 310 may be composed of one memory.

The recording unit 320 is, for example, a nonvolatile memory such as a flash memory. In the recording unit 320, images and information relating to each of the images acquired or generated by the imaging apparatus 1 are recorded by the recording control unit 150. What is recorded on the recording unit 320 may include what is recorded on the above-described provisional recording unit 310. The recording unit 320 includes a condition unit 330. The condition unit 330 records, for example, various conditions relating to determination processes which the determination unit 120 executes, and various settings relating to the operation of the imaging apparatus 1.

The operation unit 410 acquires a result of a user's operation as an input, and outputs the acquired result to the calculation circuit 100 as an operation signal. The operation unit 410 includes, for example, a push button, a tab, a dial, a slider, and a touch panel. The display 420 includes, for example, a liquid crystal display, and carry out the display based on the display information which the display control unit 170 generates. The sensor unit 510 includes sensors which measure or detect a direction and position, and a vibration, etc. The sensor unit 510 outputs values detected by the sensors to the calculation circuit 100. It should suffice if the sensor unit 510 detects the situation of the imaging apparatus 1 at a time of acquiring images. The sensor unit 510 may further include sensors which measure an inclination, an acceleration, a sound volume, a temperature, luminance, an atmospheric pressure, etc., and may include an external sensor which is provided outside the imaging apparatus 1. The clock unit 520 generates time information and outputs the time information to the calculation circuit 100. Outputs of the sensor unit 510 and clock unit 520 are acquired together, for example, when the calculation circuit 100 acquires images from the imaging unit 200, and are provisionally recorded or are recorded together with the images. The output of the sensor unit 510, which is thus acquired, is used, for example, when the calculation circuit 100 determines whether or not the present situation of the imaging apparatus 1 is a specific photography situation. In addition, if the calculation circuit 100 determines that the present situation of the imaging apparatus 1 is the specific photography situation, the calculation circuit 100 causes the imaging unit 200 to start sequential shooting movie photography. The specific photography situation and sequential shooting movie photography will be described later.

<Outline of Operation of Imaging Apparatus>

Figure 2C:
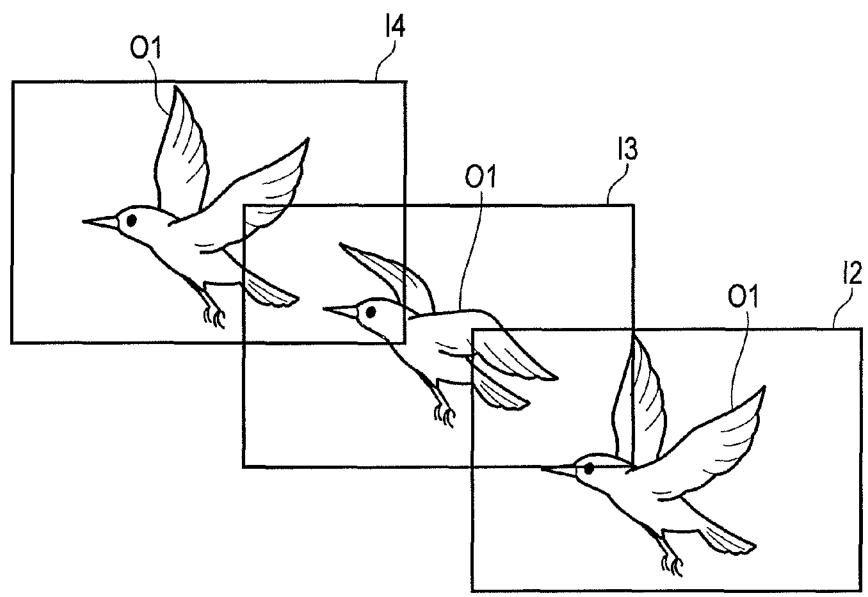
FIG. 2C is a view illustrating an example of the case in which still images are cropped from a movie according to the first embodiment.

Here, FIG. 2A illustrates an example of a state on photography using the imaging apparatus 1 according to the first embodiment, FIG. 2B illustrates an example of the relationship between a composition and a subject on photography, and FIG. 2C illustrates an example of the case in which still images are cropped from a photographed movie. For example, when a user U1 holds the imaging apparatus 1 as illustrated in FIG. 2A, there may be a case in which a subject that is a desired target of photography, suddenly appeared. A case is now described, byway of example, in which a bird O1 has appeared as the subject that the user U1 desires to photograph. For example, as illustrated in FIG. 2B, even if the user U1 is not able to obtain an optimal composition for photographing the bird O1, the user U1 quickly responds and starts, for example, movie photography when the bird O1 has entered a field angle I1 ("specific photography situation"). In this movie photography, it is difficult for the user U1 to photograph the subject with the composition suitable for the subject during the entire process, for example, because the movement of the subject is fast. In this case, the photography of a movie work is a failure. However, as illustrated in FIG. 2C, if only images such as an image 12, an image 13 and an image 14 which have the compositions suitable for the bird O1 that is the desired target of photography are extracted from among the images constituting the movie, still images that can be appreciated may be obtained. The image processing unit 180 may generate images of the composition suitable for the bird O1, by applying a trimming process or the like to images which do not have the composition suitable for the bird O1, or the subject that is the desired target of photography.

In general, characteristics that are required for image quality are different between each of images in a movie, i.e. a movie frame suitable for playback or appreciation, and a still image suitable for playback or appreciation. For example, when a movie is played back, images (image frames obtained at a predetermined timing) are sequentially displayed at a predetermined frame rate. Thus, in each of movie frames constituting the movie, having a natural connection with preceding and following movie frames, rather than having a high level of completion as a single image such as a less conspicuous blur, is considered important, and is required. Thus, in general, the exposure time in photography for a movie becomes long. On the other hand, for example, when the still image is played back, the still image is continuously displayed. Thus, in the still image, having a high level of completion as a single image, such as a less conspicuous blur, is considered important and is required. Thus, in general, the exposure time in photography for still images is shorter than the exposure time in photography for a movie.

Thus, when movie frames of the composition suitable for the subject are cropped as still images as described above, these still images are images having characteristics suitable for the movie, and it is possible that these still images do not have characteristics suitable for still images. On the other hand, if a movie which is composed of images having characteristics suitable for still images is acquired, this movie is suitable for cropping of still images. However, it is possible that this movie is not suitable for playback or appreciation. Accordingly, there is a demand for a photography method which can simultaneously acquire, for example, images for generating a movie having a connection between individual movie frames, and images which are suitable as still images.

In order to meet this demand, the imaging apparatus 1 according to the present embodiment executes sequential shooting movie photography. In the sequential shooting movie photography, photography for acquiring still images and photography for acquiring a movie are repeatedly and alternately executed at a predetermined timing during movie photography. FIG. 3 illustrates, as a timing chart, an example of the relationship between respective images in sequential shooting movie photography and exposure time according to the first embodiment. Referring to FIG. 3, the generation of still images and movie frames will be described. Hereinafter, images acquired by the sequential shooting movie photography are referred to as "sequential shooting frames", and a set of images, which are composed of the sequential shooting frames, is referred to as a "sequential shooting image group".

As illustrated in FIG. 3, it is assumed that a time corresponding to one frame of movie photography is Tf. In the sequential shooting movie photography, the photography control unit 110 in the present embodiment executes, in every Tf, a plurality of times of photography including photography for acquiring still image and photography for acquiring movie, thereby acquiring a still image frame Fs for generating a still image, and a complementary frame Fc for generating a movie. Accordingly, it can be expressed that the imaging unit 200 in the present embodiment generates an image (e.g. a sequential shooting frame, a movie frame Fm) at each of predetermined timings (e.g. Tf).

At a time of acquiring the sequential shooting frame, the frame division unit 111 determines an exposure time for acquiring movie frame Fm, based on an exposure amount which is needed for acquiring the movie frame Fm. The frame division unit 111 determines a shutter speed, which achieves this exposure time by one-time photography, as a shutter speed for acquiring movie frame Fm. The frame division unit 111 similarly determines and sets a shutter speed for acquiring still image frame Fs, based on an exposure time (first exposure time) for acquiring still image frame Fs. Hereinafter, the shutter speed for acquiring movie frame Fm is described as Tsm, and the shutter speed for acquiring still image frame Fs is described as Tss. The frame division unit 111 determines Tsm, for example, so as to obtain an exposure time suitable for the entirety of the field angle, and determines Tss, for example, so as to obtain an exposure time suitable for a subject of interest. This can also be expressed such that the frame division unit 111 determines the exposure time for acquiring movie frame Fm, for example, so as to obtain an exposure time suitable for the entirety of the field angle, and determines the first exposure time, for example, so as to obtain an exposure time suitable for a subject of interest. Furthermore, the frame division unit 111 sets a difference between the exposure time for acquiring movie frame Fm and the exposure time for acquiring still image frame Fs, as an exposure time (second exposure time) for acquiring complementary frame Fc. Specifically, the frame division unit 111 calculates and sets a shutter speed for acquiring complementary frame Fc as a difference between Tsm and Tss. Hereinafter, the shutter speed for acquiring complementary frame Fc is described as Tsc.

In this manner, the frame division unit 111 in the present embodiment divides the exposure time, which is used in the imaging unit 200 at each of predetermined timings, into a plurality of exposure times including the first exposure time for acquiring still image and the second exposure time for acquiring movie. The exposure time, which is used at each of the predetermined timings, is equal to, for example, the exposure time for acquiring movie frame Fm. Moreover, it can also be expressed that the second exposure time is a difference between the exposure time for acquiring movie frame Fm and the first exposure time.

As illustrated in a row of the sequential shooting frame in FIG. 3, the photography control unit 110 causes the imaging unit 200 to capture the still image frame Fs with Tss, and causes the imaging unit 200 to capture the complementary frame Fc with Tsc. In this manner, as illustrated in a row of the still image frame in FIG. 3, the still image frame Fs is acquired in every Tf. Thereafter, the image processing unit 180 generates the still image, based on the still image frame Fs, and generates the movie frame Fm by compositing the still image frame Fs and the complementary frame Fc. In this manner, as illustrated in a row of the movie frame in FIG. 3, the movie frame Fm, which is the same as in the case of photography with Tsm, is acquired in every Tf. Specifically, the sum of the exposure time in the photography for acquiring still image and the exposure time in the photography for acquiring movie is the exposure time for acquiring movie frame Fm, and is equal to the exposure time in the case of photography with Tsm.

This can be expressed so that the image processing unit 180 generates the still image, based on the image (e.g. still image frame Fs) that is generated by the photography with the first exposure time, and generates the movie frame Fm constituting the movie, by using the image (e.g. complementary frame Fc) generated by the photography with the second exposure time. This can also be expressed so that the image processing unit 180 generates the movie frame Fm by compositing the image (e.g. still image frame Fs) generated by the photography with the first exposure time and the image (e.g. complementary frame Fc) generated by the photography with the second exposure time.

<Operation of Imaging Apparatus According to First Embodiment>

FIG. 4 illustrates, as a flowchart, an example of an imaging apparatus control process according to the first embodiment. Referring to FIG. 4, the operation of the imaging apparatus 1 will be described.

In step S101, the calculation circuit 100 determines whether a photography mode or a playback mode is to be executed. This determination is based on an operation signal which is output by the operation unit 410 or the sensor unit 510 in accordance with a user's operation. For example, although details will be described later, if a strenuous operation performed by the user is detected, such as when the user has suddenly discovered a subject which the user wishes to photograph, is detected, the calculation circuit 100 determines a transition to the photography mode for performing the sequential shooting movie photography process ("specific photography situation"). Specifically, the mode selection in this step is not necessarily limited to a case in which the user manually executes selection. The imaging apparatus control process proceeds to step S102 if the calculation circuit 100 determines the transition to the photography mode, and proceeds to step S121 if the calculation circuit 100 determines the transition to the playback mode. This specific photography situation may be determined based on image data itself acquired by imaging (the composition or the facial expression of the subject) or a change of the image data (a movement of the subject or a movement of the camera itself), or may be determined based on the user's voice of surprise, a sound from the subject, or the manner of operation of various switches or the operation unit.

In step S102, the calculation circuit 100 acquires image data which the imaging unit 200 outputs. The calculation circuit 100 subjects the image data to proper image processing, and causes the display 420 to start live view display, based on the image data after the image processing. The calculation circuit 100 continues the live view display, for example, while the photography mode is being executed.

In step S103, based on outputs from the operation unit 410, sensor unit 510, etc., the calculation circuit 100 determines whether a strenuous operation is performed on the imaging apparatus 1. In other words, it can be determined whether or not the specific photography situation has occurred. Here, a time when a strenuous operation is performed is, for example, the time when the user has suddenly discovered a subject that the user wishes to photograph. As described above with reference to FIG. 2A to FIG. 2C, this is a time when the user wishes to photograph the subject regardless of whether by still image photography or movie photography. At this time, for example, the direction or position of the housing of the imaging apparatus 1 changes suddenly. In addition, for example, the user executes a release operation immediately after turning on power, or the user executes a release operation even in a state in which the subject is not focused. In such states, the calculation circuit 100 also determines that the strenuous operation is performed. If it is determined that the strenuous operation is performed ("specific photography situation"), the imaging apparatus control process proceeds to step S104. If not, the imaging apparatus control process proceeds to step S105.

This specific photography situation may be determined based on an acceleration. In addition, the specific photography situation may include, as well as the case of quick photography, a case of coping with a quickly moving subject, or photography with an unstable holding. Moreover, the specific photography situation may be determined in accordance with a mode setting such as a quick setting of a photography mode that is re-set by the user. In the case of a camera designed to always deal with such a situation, the specific photography situation may always be determined by setting this photography mode as a normal mode.

Figure 5:
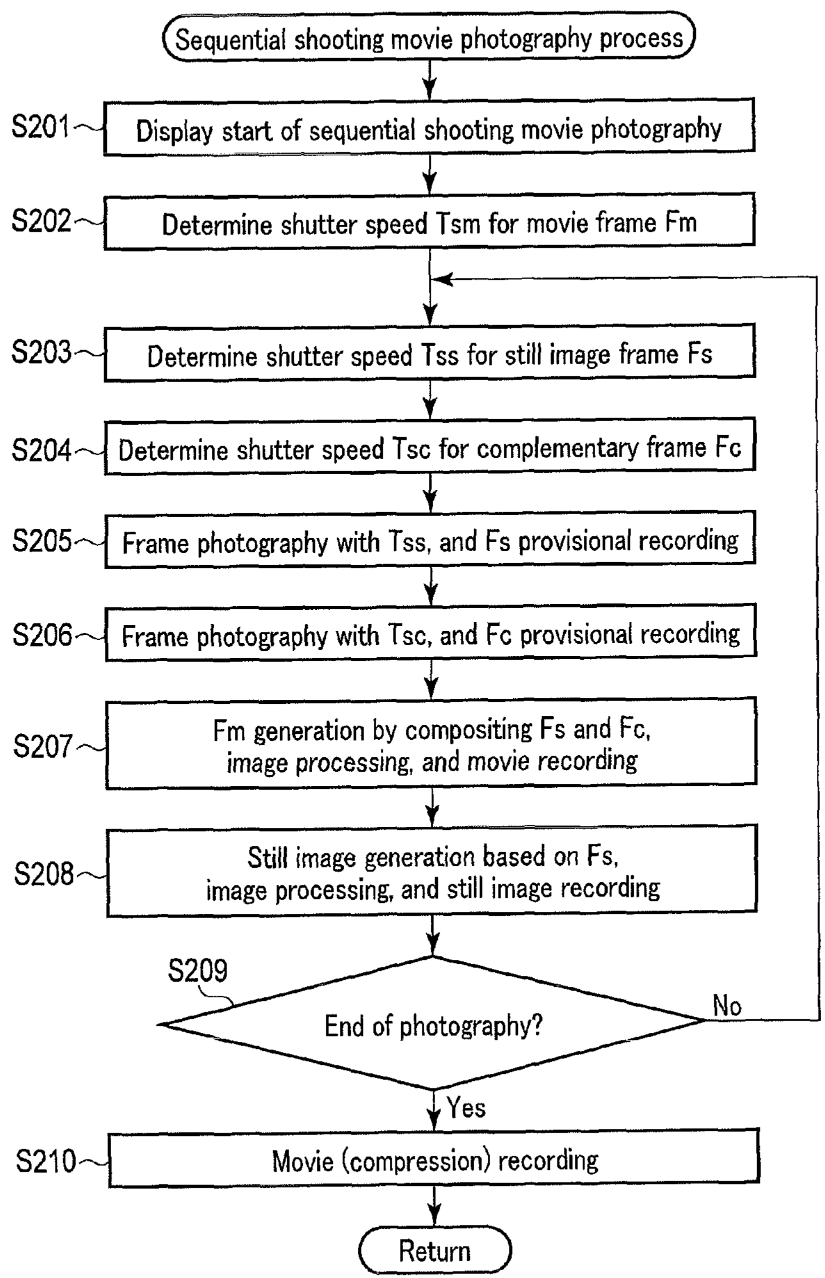
FIG. 5 is a flowchart illustrating an example of a sequential shooting movie photography process according to the first embodiment.

In step S104, the calculation circuit 100 executes the sequential shooting movie photography process. Here, FIG. 5 illustrates, as a flowchart, an example of the sequential shooting movie photography process according to the first embodiment. Referring to FIG. 5, the operation of the imaging apparatus 1 in the sequential shooting movie photography process will be described. The relationship between the respective images and the exposure time in the sequential shooting movie photography process is the same as described with reference to FIG. 3.

In step S201, the display control unit 170 executes display indicating the start of the sequential shooting movie photography to the user. The display control unit 170 included in the calculation circuit 100 generates display information indicating the start of the sequential shooting movie photography, outputs this display information, and causes the display 420 to display the display information. This display may be of any form, and may be character information or information by figures or colors, if the display can inform the user that the sequential shooting movie photography is started or is being executed. The display control unit 170 may execute this display only at the start of the photography, or may continue the display while the sequential shooting movie photography is being executed. Thereafter, the sequential shooting movie photography process proceeds to step S202.

In step S202, the frame division unit 111 determines, based on a subject luminance, the shutter speed Tsm for acquiring movie frame Fm. In step S203, the frame division unit 111 determines, based on the subject luminance, the shutter speed Tss for acquiring still image frame Fs. In addition, in step S204, the frame division unit 111 calculates a difference between the Tsm and Tss, and calculates the shutter speed Tsc for acquiring complementary frame Fc. These set shutter speeds are stored on, for example, the provisional recording unit 310.

In step S205, the calculation circuit 100 acquires and provisionally records the still image frame Fs. In this step, the photography control unit 110 causes the imaging unit 200 to execute imaging with the Tss that is determined in step S203. The calculation circuit 100 acquires, as the still image frame Fs, the image data acquired by the imaging by the imaging unit 200. The recording control unit 150 allows the Fs storage unit 311 included in the provisional recording unit 310 to store the still image frame Fs.

In step S206, the calculation circuit 100 acquires and provisionally records the complementary frame Fc. In this step, the photography control unit 110 causes the imaging unit 200 to execute imaging with the Tsc which is calculated in step S204. The calculation circuit 100 acquires, as the complementary frame Fc, the image data acquired by the imaging by the imaging unit 200. The recording control unit 150 allows the Fc storage unit 312 included in the provisional recording unit 310 to store the complementary frame Fc.

In step S207, the calculation circuit 100 generates and records movie data. In this step, the image processing unit 180 composites the still image frame Fs and complementary frame Fc which the provisional recording unit 310 stores, and generates the movie frame Fm. By compositing the still image frame Fs and complementary frame Fc in this manner, the imaging apparatus 1 can obtain the same image as in the case of photography with Tsm. The recording control unit 150 allows the Fm storage unit 313 included in the provisional recording unit 310 to store the generated movie frame Fm. Based on the movie frame Fm, the calculation circuit 100 generates movie data, and allows the provisional recording unit 310, or recording unit 320 to store the movie data.

In step S208, the calculation circuit 100 generates and records a still image. In this step, the image processing unit 180 generates a still image, based on the still image frame Fs that the provisional recording unit 310 stores. If necessary, the recording control unit 150 compresses the still image and allows the still image to record on the recording unit 320.

In step S207 and step S208, the image processing unit 180 subjects, for example, each movie frame Fm included in the movie to such a contrast correction process or gradation correction process so as to not lose smoothness between the respective movie frames Fm. At this time, in order to make a subsequent edit easier, the image processing unit 180 may execute an image process so as to leave the gradation as such. On the other hand, the image processing unit 180 subjects the still image frame Fs or still image to such still-image-like image processing that each image exhibits its own characteristics. In addition, the image processing unit 180 may execute, for example, a special-effect process suitable for the situation, so as to add sharpness to the generated movie. Even in the case of the same movie frame Fm, the processed result may not be replaced with the movie frame Fm before the image process, and may be recorded on the recording unit 320 or the like apart from the movie frame Fm before the image process. Such an image process corresponding to the purpose of use may be executed at a time of playback. Also, the image processing unit 180 may correct, for example, the still image frame Fs so that blurring becomes invisible, and may not correct the blur of the movie frame Fm so strictly, since the movie frame Fm immediately changes to the next movie frame Fm at the time of playback.

In step S209, the calculation circuit 100 determines whether or not to finish the sequential shooting movie photography. The determination as to whether or not to finish the sequential shooting movie photography may be executed, for example, based on an operation signal which the operation unit 410 outputs in response to the user's operation, or may be executed after the passage of a predetermined time from the start of the sequential shooting movie photography. If it is determined that the sequential shooting movie photography is not to be finished, the sequential shooting movie photography process returns to step S203, and the process of step S203 to step S209 is repeatedly executed until it is determined in step S209 that the sequential shooting movie photography is to be finished. If it is determined in step S209 that the sequential shooting movie photography is to be finished, the sequential shooting movie photography process proceeds to step S210.

In step S210, the calculation circuit 100 compresses and records the movie data. In this step, the recording control unit 150 records the movie data, which the compression control unit 130 compressed, into the recording unit 320. Thereafter, the sequential shooting movie photography process ends, and the imaging apparatus control process proceeds to step S105.

In this manner, the imaging apparatus 1 according to the present embodiment can generate, in each single frame, the still image suitable for playback or for appreciation, and can generate, at the same time, the movie frame Fm that is the same as the case of photography with Tsm. The process of step S203 in this repetitive process may be executed where necessary when Tss needs to be changed, such as when there is a large change in exposure of a subject. When there is no change in exposure, the process of step S203 does not need to be executed. When there is such a change in exposure, photography may be executed by changing the sensitivity of photography, without changing the Tss. In addition, it is preferable that the exposure time for acquiring still image frame Fs is limited to a time in such a range that no camera shake occurs. For example, when a subject of interest is dark, there is a case in which the exposure time exceeds the time limit in which no camera shake occurs. In this case, a deficiency in exposure may be compensated by amplification. The Tss on the sequential shooting movie photography can be set within such a range that the still image can be generated by amplifying the still image frame Fs in step S208, and that the Tss does not exceed a time which is calculated by subtracting the time necessary for a process relating photography from the time Tf of one frame of the movie which is acquired at the same time. Although it is described that the calculation circuit 100 executes the image processes suitable for the still image and movie at the time of generating the still image and movie, the calculation circuit 100 may execute these image processes at the time of acquiring the still image frame Fs and complementary frame Fc or at the time of recording the movie.

Referring back to FIG. 4, a description will be given of the operation of the imaging apparatus 1 after the sequential shooting movie photography process in step S104 is finished. In step S105, the calculation circuit 100 determines whether or not to execute mode and parameter setting, for example, based on an operation signal which the operation unit 410 outputs in accordance with the user's operation. If it is determined that the setting is to be executed, the imaging apparatus control process proceeds to step S106. In step S106, the calculation circuit 100 executes, for example, the setting of an art filter, and the mode and parameter setting relating to the still image photography or movie photography process, such as exposure correction. The set conditions, etc. are stored on, for example, the provisional recording unit 310. When it is determined in step S105 that the setting is not to be executed, and also after the setting in step S106, the imaging apparatus control process proceeds to step S107.

In step S107, the calculation circuit 100 determines whether or not to execute still image photography, for example, based on an operation signal that the operation unit 410 outputs in accordance with the user's operation. The user's operation is, for example, depressing of the release button. If it is determined that the still image photography is to be executed, the imaging apparatus control process proceeds to step S108. In step S108, the calculation circuit 100 executes a photography operation of a still image, and performs acquisition of the still image, image processing, recording, etc. When it is determined in step S107 that the still image photography is not to be executed, and also after the still image photography in step S108, the imaging apparatus control process proceeds to step S109.

In step S109, the calculation circuit 100 determines whether or not to execute movie photography, for example, based on an operation signal which the operation unit 410 outputs in accordance with the user's operation. If it is determined that the movie photography is to be started, the imaging apparatus control process proceeds to step S110. In step S110, the calculation circuit 100 executes a photography operation of a movie, and performs acquisition of the movie frame, image processing, compression, recording, etc. If it is determined in step S109 that the movie photography is not to be started, and also after the movie photography in step S110, the imaging apparatus control process returns to step S101.

In step S121, the calculation circuit 100 determines which of still images or movies is to be played back, for example, based on an operation signal which the operation unit 410 outputs in accordance with the user's operation. At this time, the calculation circuit 100 causes the display 420 to display, for example, a list of still images or movies, which are recorded on the recording unit 320. In step S122, based on a user's operation, the calculation circuit 100 determines a playback method by which playback is executed, for example, a method in which still images are played back as a slide show. In step S123, the calculation circuit 100 starts the playback of the selected movie or still image by the selected playback method.

In step S124, the calculation circuit 100 determines whether or not to finish the playback. In this determination, the calculation circuit 100 determines that the playback is not to be finished, for example, when the operation unit 410 does not detect a user's operation, or when the operation unit 410 detects a user's operation but this user's operation does not relate to the finish of playback. The calculation circuit 100 determines that the playback is to be finished, for example, when the operation unit 410 detects a user's operation relating to ending playback. If it is determined that the playback is to be finished, the imaging apparatus control process finishes the playback, and returns to step S101. If it is determined that the playback is not to be finished, the imaging apparatus control process proceeds to step S125.

In step S125, the calculation circuit 100 determines whether or not to change the playback method. In this determination, the calculation circuit 100 determines that the playback method is not to be changed, for example, when the operation unit 410 does not detect a user's operation, or when the operation unit 410 detects a user's operation but this user's operation does not relate to the change of the playback method. The calculation circuit 100 determines that the playback method is to be changed, for example, when the operation unit 410 detects a user's operation relating to the change of the playback method. If it is determined that the playback method is to be changed, the imaging apparatus control process does to step S126.

In step S126, the calculation circuit 100 determines the playback method which the user selected, by acquiring an output from the operation unit 410, and starts playback by this playback method. When it is determined in step S125 that the playback method is not to be changed, and also after the playback is started in step S126, the imaging apparatus control process returns to step S124 and the process of step S124 to step S126 is repeated until it is determined in step S124 that the playback is to be finished.

For the user's operation in each of the processes relating to the above-described imaging apparatus control process, the imaging apparatus 1 may be provided with operational parts corresponding to the respective operations, such as the selection or change of the photography mode and playback mode, the start of sequential shooting movie photography, the still image photography, the movie photography, the selection of the playback method, the start of playback, the suspension of playback, the end of playback, the change of the playback method, etc.

Depending on the values of Tsm and Tss which are determined based on the subject luminance, the movie frame Fm may not be generated by compositing the image acquired by the photography for acquiring movie, and the still image frame Fs. In this case, the exposure time in the photography for acquiring movie (photography with the second exposure time), which is executed, for example, together with the photography for acquiring still image (photography with the first exposure time), corresponds to, for example, the exposure time for acquiring movie frame Fm. In addition, the movie frame Fm is generated based on only the image acquired by the photography for acquiring movie, and the movie is generated. At this time, the exposure time used at each of the predetermined timings is equal to the sum of the first exposure time and second exposure time.

In addition, although it is described that the strenuous operation of the user is the trigger of the start of the sequential shooting movie photography, the sequential shooting movie photography may be started, for example, by the depression of a record button. The imaging apparatus 1 according to the present embodiment is effective not only in the case of quick photography, but also in the case in which a quickly moving subject is to be photographed, and the case in which both a movie and a still image are to be photographed, for example, in an athletic event, a wedding party, etc.

The imaging apparatus 1 according to the present embodiment is described with respect to the case of executing photography without changing the shutter speed Tem for acquiring movie frame Fm during the sequential shooting movie photography, but is not limited to this. The repetitive process of step S203 to step S209 in the sequential shooting movie photography process may be executed by including step S202. At this time, the frame division unit 111 updates the Tsm in accordance with the exposure of the subject or the entirety of the field angle, and may update the Tss and Tsc in accordance with the updated Tsm.

The imaging apparatus 1 according to the present embodiment is described with respect to the case of acquiring sequential shooting frames by executing photography twice in every Tf. However, it is not limited to it. The imaging apparatus 1 may execute any number of times of photography during the time Tf by shortening the exposure time relating to each photography, within such a range as to be capable of obtaining an exposure enough to generate the still image or movie.

The frame division unit 111 included in the imaging apparatus 1 according to the present embodiment can acquire the still image suitable for playback or appreciation in every single frame in sequential shooting movie photography. In addition, the frame division unit 111 further acquires the complementary frame Fc which is generated by photography for acquiring movie in every single frame in sequential shooting movie photography. Specifically, the imaging apparatus 1 successively acquires the still image frame Fs suitable for the generation of the still image, and the complementary frame Fc that is composited with this still image frame Fs to become the movie frame Fm suitable for the generation of the movie. Thereby, the still image suitable for playback or appreciation, and the movie can be acquired at the same time.

In this manner, by using the imaging apparatus 1 according to the present embodiment, the user can acquire not only the movie but also the still image having the image quality suitable for playback or appreciation, without losing an opportunity for photography, for example, when the user has suddenly discovered a desired target for photography. The imaging apparatus 1 according to the present embodiment starts sequential shooting movie photography in accordance with a result of the determination as to whether or not the user's strenuous operation is detected (whether or not the specific photography situation occurs). Thus, even in a situation in which the user wishes quick photography, it should suffice if the user directs the imaging apparatus 1 toward the subject of interest, and the user does not need to perform any other operation. Moreover, the imaging apparatus 1 according to the present embodiment can also be used not only when the user wishes quick photography, but also when the user wishes to acquire both the still image and the movie (specific photography situation).

On the other hand, the sequential shooting movie photography is not executed, for example, when it is determined that the specific photography situation does not occur. In such case, since the imaging apparatus 1 is not required to execute the sequential shooting movie photography by the divisional exposure as described with reference to FIG. 3, there is no need to execute a complex control relating to gain UP, etc., or a change in setting, such as securing of a memory. Specifically, when the imaging apparatus 1 does not execute the sequential shooting movie photography which involves the divisional exposure, there is no need to execute unnecessary processes, and the process relating to the operation of the imaging apparatus 1 can be executed at high speed. In this manner, the imaging apparatus 1 according to the present embodiment can select whether or not to execute the divisional exposure. Therefore, if the user uses the imaging apparatus 1 according to the present embodiment, the process relating to the operation of the imaging apparatus 1 can be executed at high speed when the sequential shooting movie photography is unnecessary.

[Second Embodiment]

A second embodiment of the invention will be described. Here, those points different from the first embodiment will be described, and a description of the same parts denoted by like reference numerals is omitted. In the first embodiment, the frame division unit 111 determines the Tss to be one Tss before photography, based on the subject luminance. By contrast, in the present embodiment, AE bracketing is used, and photography is executed by using a plurality of shutter speeds Tss at every predetermined timing, i.e. at every Tf. The determination unit 120 may evaluate a plurality of still image frames Fs acquired by executing photography at different shutter speeds Tss in a specific frame of the sequential shooting exposure photography, and the determination unit 120 may determine the proper Tss in subsequent frames, based on the evaluation.

FIG. 6 illustrates, as a timing chart, an example of the relationship between respective images in a sequential shooting movie photography process and exposure time according to the second embodiment. Referring to FIG. 6, this example will be described. After determining the Tsm, the frame division unit 111 sets, for example, a shutter speed for acquiring first still image frame Fs1, a shutter speed for acquiring second still image frame Fs2, and a shutter speed for acquiring third still image frame Fs3. Hereinafter, the shutter speed for acquiring first still image frame Fs1 is described as Tss1, the shutter speed for acquiring second still image frame Fs2 is described as Tss2, and the shutter speed for acquiring third still image frame Fs3 is described as Tss3.

The frame division unit 111 calculates and sets a shutter speed for acquiring first complementary frame Fc1 as a difference between Tsm and Tss1. Similarly, the frame division unit 111 calculates and sets a shutter speed for acquiring second complementary frame Fc2 as a difference between Tsm and Tss2, and calculates and sets a shutter speed for acquiring third complementary frame Fc3 as a difference between Tsm and Tss3. Hereinafter, the shutter speed for acquiring first complementary frame Fc1 is described as Tsc1, the shutter speed for acquiring second complementary frame Fc2 is described as Tsc2, and the shutter speed for acquiring third complementary frame Fc3 is described as Tsc3.

The photography control unit 110 causes the imaging unit 200 to capture, for example, in a first frame, the first still image frame Fs1 and first complementary frame Fc1 by using Tss1 and Tsc1. The image processing unit 180 generates a first movie frame Fm1 by compositing the first still image frame Fs1 and first complementary frame Fc1, and generates a first still image, based on the first still image frame Fs1. Thereafter, in the same manner as described above in the first embodiment, the calculation circuit 100 executes image processing, recording, etc. At this time, the Fs storage unit 311 stores at least the first still image frame Fs1 or the generated still image.

Similarly, the calculation circuit 100 acquires, in a second frame, the second still image frame Fs2 and second complementary frame Fc2 by using Tss2 and Tsc2, generates a second movie frame Fm2 and a second still image, and executes image processing, recording, etc. The calculation circuit 100 acquires, in a third frame, the third still image frame Fs3 and third complementary frame Fc3 by using Tss3 and Tsc3, generates a third movie frame Fm3 and a third still image, and executes image processing, recording, etc.

In this manner, the frame division unit 111 according to the present embodiment sets a plurality of first exposure times (Tss), and causes the imaging unit 200 to execute imaging by using the different first exposure times at each of the predetermined timings (Tf).

The determination unit 120 may evaluate a plurality of still image frames or a plurality of still images, which are thus acquired, and may determine which of the three shutter speeds Tss1, Tss2 and Tss3 is appropriate. Based on the result of this determination, the frame division unit 111 may determine the Tss in subsequent frames. For example, when the exposure of the subject has greatly changed during the sequential shooting movie photography, the calculation circuit 100 may newly set the Tss as described above, may evaluate the still image frame or still image acquired by the imaging by the imaging unit 200, and may update the Tss in accordance with the result of the evaluation. The determination unit 120 may execute the above-described determination in every frame, and imaging may be executed with the exposure time with which this image is acquired from the time point when an image with proper exposure is determined, or imaging may be executed also in the fourth and following frames, for example, by repeatedly using the three exposure times by the AE bracketing. When the imaging is repeated by repeatedly using the three exposure times, the determination unit 120 may execute, for example, the above-described determination after the end of photography, and may extract the still image frame of the exposure suitable for the subject, based on the result of the determination. The still image may be generated by executing High Dynamic Range (HDR) compositing of at least two of the first still image frame Fs1, second still image frame Fs2 and third still image frame Fs3.

Depending on the subject luminance, the imaging apparatus 1 according to the present embodiment may, for example, acquire during the Tf the first still image frame Fs1, second still image frame Fs2, and third still image frame Fs3 and evaluate these frames.

The imaging apparatus 1 according to the present embodiment is described with respect to the case in which imaging is executed with three mutually different exposure times in accordance with three kinds of exposure states, but is not limited to this. The number of exposure times for use in imaging may be two, three or more. In addition, the same advantageous effects as with the technique relating to the present embodiment can also be obtained by changing the exposure by not using the shutter speeds, but instead a plurality of aperture values or ISO sensitivities.

In the techniques of the first embodiment and the present embodiment, for example, only in the photography for still images, the photography may be executed by using focus bracketing in different focus states between frames. In this case, there is no need to perform strict focusing on the subject before photography, and it is possible to properly capture the subject even by quick photography. The sequential shooting photography can be executed by using AE bracketing and focus bracketing in combination.

The imaging apparatus 1 according to the present embodiment executes imaging with a plurality of exposures, and can obtain the still image frame Fs and movie frame Fm at the same time. In addition to the advantageous effects obtained in the first embodiment, the second embodiment has the following advantageous effects. The imaging apparatus 1 according to the present embodiment can obtain the still image frames Fs under the plural exposure conditions. The imaging apparatus 1 can evaluate the plural still image frames Fs acquired by the plural exposures, and can determine or update the shutter speed Tss for acquiring still image frame Fs. Thus, the imaging apparatus 1 according to the present embodiment can obtain images under different conditions with respect to only the still images, without changing the exposure of the movie, regardless of the photography environment and the situation of the subject. In other words, the imaging apparatus 1 according to the present embodiment enables the user to acquire the still image with a more suitable image quality and the movie at the same time.

[Third Embodiment]

A third embodiment of the invention will be described. Here, those points different from the first and second embodiments will be described, and a description of the same parts are denoted by like reference numerals is omitted. In the imaging apparatus 1 according to the first embodiment or the second embodiment, the still images with suitable image quality and the movie can be acquired at the same time even on quick photography. However, among the still images and movie, there exist not a few images which are unneeded for use in appreciation, for example, since such images include scenes in which the photographer could not follow the movement of the subject.

In this case, as described with reference to FIG. 2C, only images having the composition suitable for the subject or including the subject may be extracted, or images having the composition suitable for the subject may be generated by a trimming process or the like. However, since the imaging apparatus 1 of each of the above-described embodiments generates the still image in every frame of the movie, it is difficult for the user to confirm all of a large number of generated still images, in particular, in the case in which the photography time is long. Thus, the technique relating to the present embodiment enables such still images as described above to be determined and selected from the still images generated by the sequential shooting movie photography, and to be generated. Thereby, the imaging apparatus 1 can provide the user with the plurality of still images suitable for playback or appreciation and the movie at the same time.

Here, the respective components of the imaging apparatus 1 according to the present embodiment and the operations of these respective components will be described. The determination unit 120 determines whether the still image has the image quality or the composition suitable for playback or appreciation. In this determination, for example, it is determined whether or not the image has proper exposure, whether or not the image includes the subject, and whether the image has the composition suitable for the subject when the image includes the subject.

The selection unit 140 selects the still image to be recorded, based on the determination by the determination unit 120, or based on the output of the operation unit 410 according to the user's operation. The image processing unit 180 may execute, for example, a trimming process or the like on the still image which the determination unit 120 determined to have proper image quality and determined to include the subject, thereby generating the still image having the composition suitable for the subject.

The provisional recording unit 310 sequentially stores the image which the determination unit 120 determined to have the image quality or composition suitable for playback or appreciation, the image which the selection unit 140 selected, and the image which the image processing unit 180 generated. Specifically, the respective components of the calculation circuit 100 execute processes on the images which the provisional recording unit 310, stores, and allow the provisional recording unit 310 to store the results of the processes.

After the images were selected through the above determination, if the change of the subject is small or there is no change of the subject because, for example, the images are temporally continuous, the selection unit 140 may further select still images, based on the time interval of acquisition of the images. The conditions, etc. of the above-described determination and selection are recorded on the recording unit 320.

Although it is described that the above determination is executed on the still images, it is not limited to this. The above-mentioned processes such as determination and selection may be executed on the still image frame Fs, or may be executed on the movie frame Fm. For example, when the above determination is executed on the still image frame Fs, the image processing unit 180 may generate the still image, based on only the still image frame Fs which is determined to have the image quality or composition suitable for playback or appreciation.

The imaging apparatus 1 according to the present embodiment has the advantageous effects obtained by the first embodiment and second embodiment. Moreover, this imaging apparatus 1 has the advantageous effect that a still image group, which is composed of only the images having the image quality suitable for playback or appreciation and the composition suitable for the subject, can be acquired without the hassle of the user having to make a selection after photography.

[Fourth Embodiment]

A fourth embodiment of the invention will be described. Here, those points different from the first embodiment, second embodiment or third embodiment will be described, and a description of the same parts are denoted by like reference numerals is omitted.

For example, each of the still images, which the imaging apparatus 1 according to the above-described embodiments generates, may be appreciated as a single still image. However, these still images may be appreciated as a time-lapse movie, which is such a movie that shows the outline of the photographed movie composed of a plurality of still images. The imaging apparatus 1 according to the present embodiment further determines whether or not the generated still images are suitable for the time-lapse movie, and generates a time-lapse movie which has a continuity and a characteristic of a story, and is composed of the images determined to be suitable for the time-lapse movie.

Figure 7:
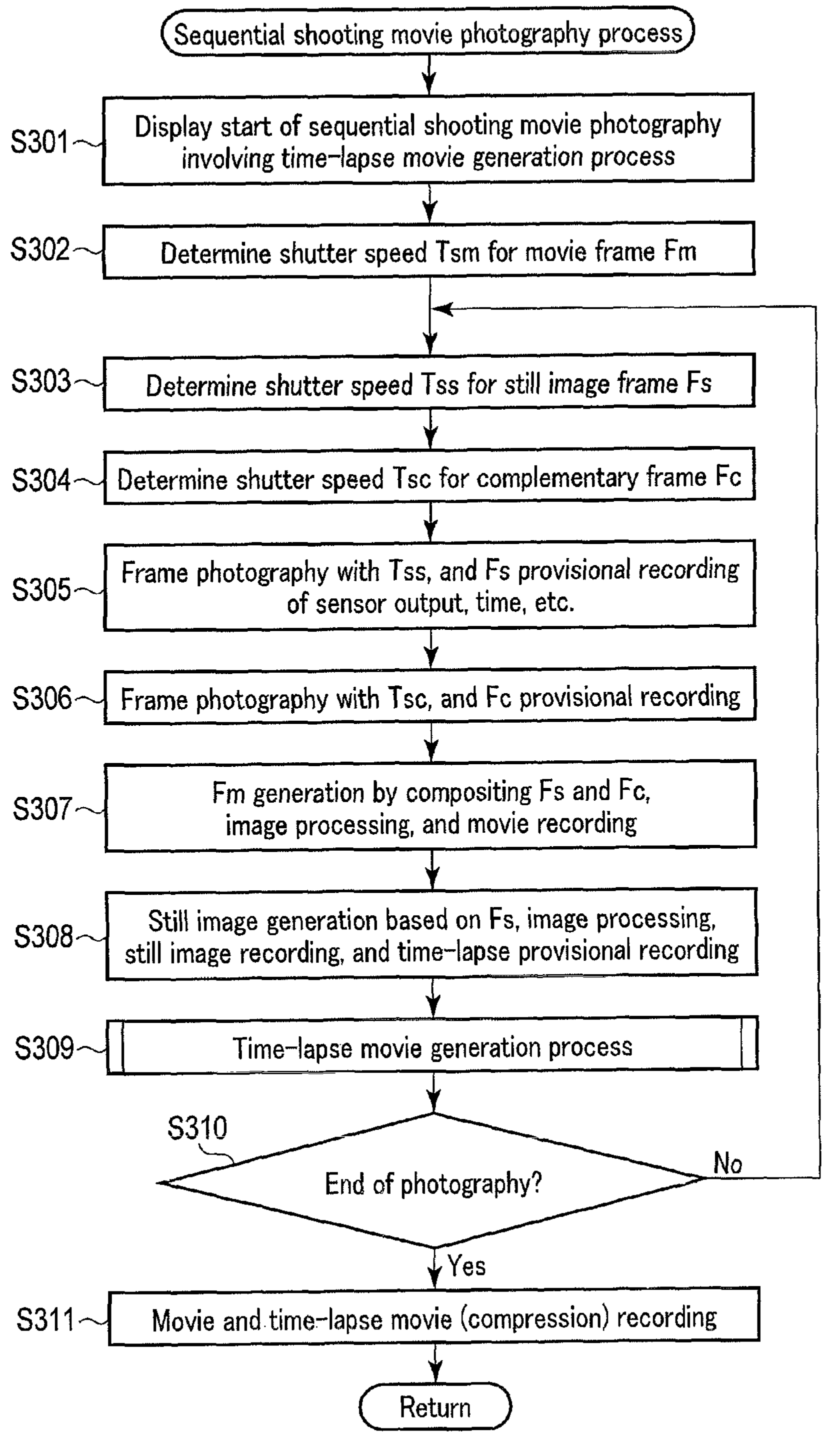
FIG. 7 is a flowchart illustrating an example of a sequential shooting movie photography process involving a time-lapse movie generation process according to a fourth embodiment.

The imaging apparatus control process in the present embodiment executes a sequential shooting movie photography process and a time-lapse movie generation process, in place of, or in addition to, the movie photography process in step S110. FIG. 7 illustrates, as a flowchart, an example of the sequential shooting movie photography process involving the time-lapse movie generation process according to the fourth embodiment. Referring to FIG. 7, the time-lapse movie generation process will be described. Determination conditions and thresholds in respective determination processes in the present embodiment are pre-recorded on the condition unit 330. The thresholds may be set by the user.

In step S301, like step S201 in the sequential shooting movie photography process according the first embodiment described above with reference to FIG. 5, the calculation circuit 100 executes display indicating the start of the sequential shooting movie photography involving the time-lapse movie generation process.

In step S302 to step S308, the calculation circuit 100 executes the same process as in step S203 to step S208 in the sequential shooting movie photography process according the first embodiment. Specifically, the calculation circuit 100 acquires the still image frame Fs and complementary frame Fc, generates and provisionally records the movie frame Fm, generates the still image and movie, and records the still image and movie by subjecting them to the image processing.

In the sequential shooting movie photography process according to the present embodiment, in step S305, the calculation circuit 100 further executes a process of acquiring outputs of the sensor unit 510 and clock unit 520 at the time of acquisition of the still image frame Fs, and allowing the provisional recording unit 310 to store the outputs. Although the details will be described later, the outputs of the sensor unit 510 and clock unit 520, which are stored here, are used in determining whether the generated still images are suitable as image constituting the time-lapse movie. In addition, in step S308, the calculation circuit 100 further executes a process of allowing the provisional recording unit 310 to store the generated still images. Hereinafter, a set of still images, which are provisionally recorded here, will be referred to as "first image group".

In step S309, the calculation circuit 100 executes the time-lapse movie generation process (to be described later), and selects and records candidates of images constituting a time-lapse movie, that is, time-lapse candidate frames. In step S310, the calculation circuit 100 determines whether or not to end the photography, for example, based on an output of the operation unit 410 corresponding to the user's operation. If it is determined that the photography will not be ended, the sequential shooting movie photography process returns to step S303, and the process of step S303 to step S310 is repeatedly executed until it is determined in step S310 that the photography is to be ended. If it is determined in step S310 that the photography is to be ended, the sequential shooting movie photography process proceeds to step S311.

In step S311, the calculation circuit 100 generates a time-lapse movie, based on the time-lapse candidate frames which the provisional recording unit 310 stores. If necessary, the calculation circuit 100 executes a compression process on the generated movie and time-lapse movie, and allows the recording unit 320 to store the movie and time-lapse movie. After the recording, the sequential shooting movie photography process ends, and the imaging apparatus control process proceeds to step S101.

Figure 8:
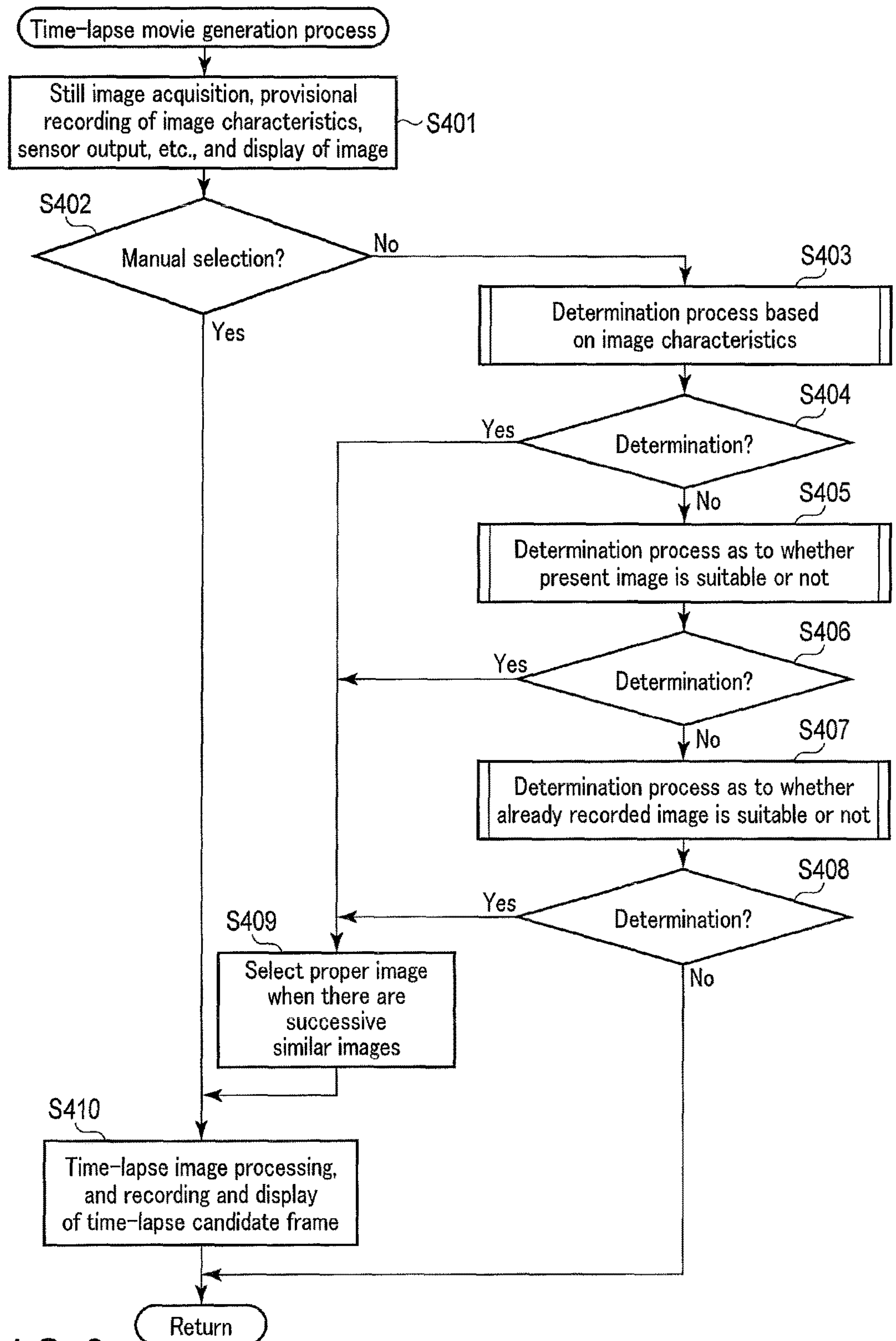
FIG. 8 is a flowchart illustrating an example of the time-lapse movie generation process according to the fourth embodiment.

Here, FIG. 8 illustrates, as a flowchart, an example of the time-lapse movie generation process according to the fourth embodiment. Referring to FIG. 8, the time-lapse movie generation process in step S309 will be described.

In step S401, the calculation circuit 100 executes a preprocess relating to the time-lapse movie generation process. The calculation circuit 100 acquires a still image from the first image group which the provisional recording unit 310 stores, detects image characteristics of the image, allows the provisional recording unit 310 to store the detected image characteristics, and causes the display 420 to display the image. The image characteristics detected here include, for example, the face of a person, a pet, a bird, a part of a characteristic scene, luminance, etc.

In step S402, the calculation circuit 100 determines whether the user has selected this image as a candidate of images constituting a time-lapse movie, that is, a time-lapse candidate frame based on an output of the operation unit 410 corresponding to, for example, the user's operation. If it is determined that the image is manually selected, the time-lapse movie generation process proceeds to step S410. If it is determined that the image is not manually selected, the time-lapse movie generation process proceeds to step S403. In the present step, the user can also execute such manual selection so as to not select the image as the time-lapse candidate frame.

In step S403, the calculation circuit 100 executes a determination process based on the characteristics of the image. Hereinafter, a determination process based on the characteristics of a movie frame is referred to as a "first determination process", and each of determination conditions, which the first determination process includes, is referred to as a "first determination condition". The details of the first determination process and first determination condition will be described later. In step S404, the determination unit 120 evaluates the result of the first determination process. If it is determined that the image satisfies the first determination condition, the time-lapse movie generation process proceeds to step S409. If it is determined that the image does not satisfy the first determination condition, the time-lapse movie generation process proceeds to step S405.

In step S405, based on the result of analysis of the image that the provisional recording unit 310 stores, the calculation circuit 100 executes a determination process of determining, from the relationship with the already recorded image, whether this image is suitable as an image constituting the time-lapse movie. Hereinafter, this determination process is referred to as a "second determination process", and each of determination conditions, which the second determination process includes, is referred to as a "second determination condition". The details of the second determination process and second determination condition will be described later. In step S406, the determination unit 120 evaluates the result of the second determination process. If it is determined that the image is suitable, the time-lapse movie generation process proceeds to step S409. If it is determined that the image is not suitable, the time-lapse movie generation process proceeds to step S407.

In step S407, based on the result of analysis of the image which the provisional recording unit 310 stores, the calculation circuit 100 executes a determination process of determining, from the relationship with this image, whether the already recorded image is suitable as an image constituting the time-lapse movie. Hereinafter, this determination process is referred to as a "third determination process", and each of determination conditions, which the third determination process includes, is referred to as a "third determination condition". The details of the third determination process and third determination condition will be described later. In step S408, the determination unit 120 evaluates the result of the third determination process. If it is determined that the already recorded image is suitable, the time-lapse movie generation process proceeds to step S409. If it is determined that the already recorded image is not suitable, the time-lapse movie generation process is terminated and the sequential shooting movie photography process proceeds to step S310.

In step S409, if an image that is temporally continuous with and similar to the selected time-lapse candidate frame, already exists among the time-lapse candidate frames, the selection unit 140 selects an image which is more suitable for the time-lapse movie in accordance with a fourth determination condition. This step may be executed after it is determined in step S402 that the image is manually selected. The determination process based on the fourth determination condition may execute the selection based on the time interval between the time-lapse candidate frames, or may execute the selection by calculating scores indicating the degrees of agreement with the conditions in the first to third determination processes, and by being based on the score that each time-lapse candidate frame has. Such selection may also be executed by manual selection by the user.

In step S410, the calculation circuit 100 allows the provisional recording unit 310 to store the selected time-lapse candidate frame, and causes the display 420 to display the selected time-lapse candidate frame. Here, the image processing unit 180 executes an image process suitable for the time-lapse movie on each of the time-lapse candidate frames. Thereafter, the time-lapse movie generation process is terminated, and the sequential shooting movie photography process proceeds to step S310.

In step S307 and step S308 of the sequential shooting movie photography process, a process that places importance on a smooth transition between movie frames Fm, is applied to the movie, and a process suitable for still images is applied to the still image. In the time-lapse movie generation process according to the present embodiment, since the time-lapse movie is generated based on the still images generated by the sequential shooting movie photography process, each time-lapse candidate frame has characteristics suitable for still images. Thus, an image process, which emphasizes a transition in situation or a change between movie frames, may be applied to the images constituting the time-lapse movie, that is, the time-lapse movie frames. The image process executed here is, for example, a process to increase the contrast, and to smooth the presentation of gradation to that of still images. If necessary, the calculation circuit 100 may execute a process of smoothing the connection between time-lapse movie frames in the image process. This image process may be executed at the time of recording the time-lapse movie in step S311 of the sequential shooting movie photography process.

Figure 9:
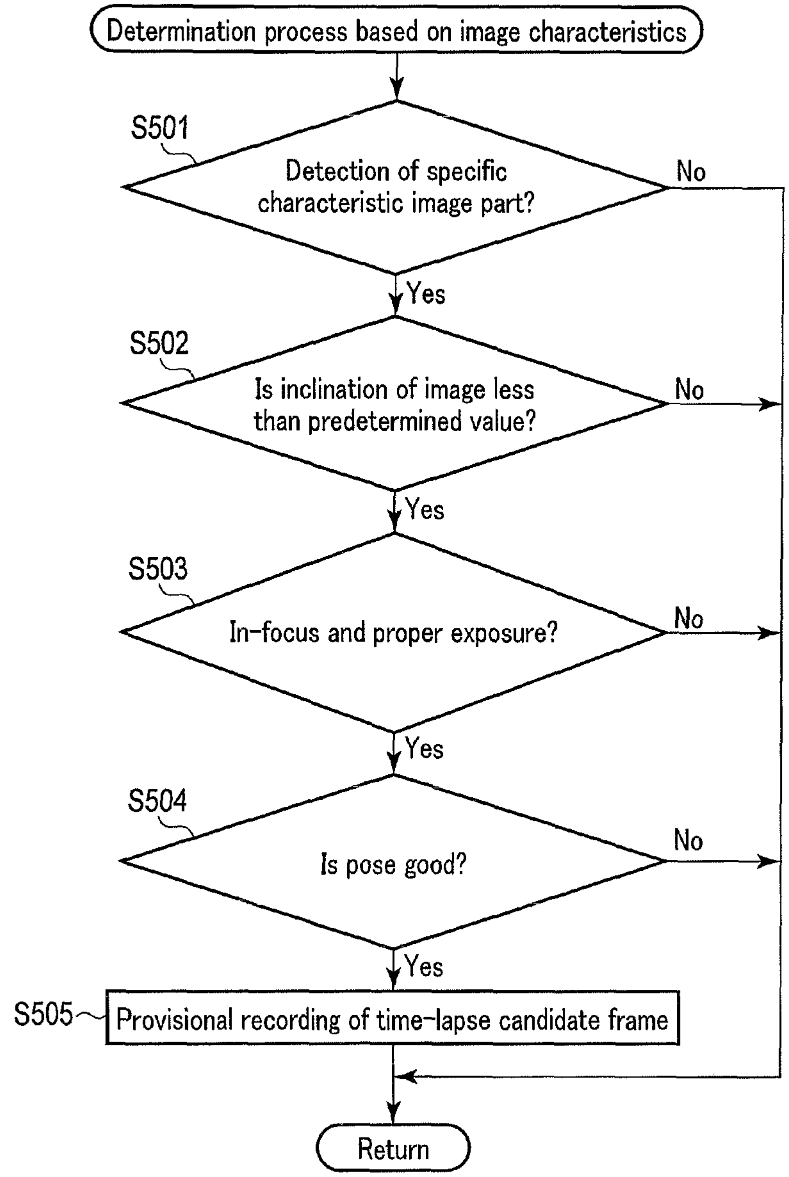
FIG. 9 is a flowchart illustrating an example of a determination process based on characteristics of an image according to the fourth embodiment.

Here, FIG. 9 illustrates, as a flowchart, an example of the determination process based on characteristics of an image according to the fourth embodiment. Referring to FIG. 9, the first determination process will be described. The determination unit 120 determines in step S501 whether or not the image has a specific characteristic image part, determines in step S502 whether or not the inclination of the image is less than a predetermined threshold, determines in step S503 whether or not the image is in focus and has proper exposure, and determines in step S504 whether or not the pose of the subject is good. If it is determined that the image has satisfied all conditions of step S501 to S504, the first determination process proceeds to step S505. In step S505, the calculation circuit 100 selects the image as a time-lapse candidate frame, and allows the provisional recording unit 310 to store the image. Thereafter, the first determination process is terminated.

If it is determined that the image fails to satisfy any one of the conditions of step S501 to S504, the first determination process is terminated, and the time-lapse movie generation process proceeds to step S404. Specifically, at this time, the image is not selected as a time-lapse candidate frame.

The specific characteristic image part may include, in addition to the image characteristic provisionally recorded in step S401, a characteristic in a scene, for example, a natural object such as a mountain or a river, and an artificial object such as a door, a wall, a building structure, etc. The inclination of the image may be detected by an image process with reference to a characteristic part that the present movie frame includes, or may be detected based on an output of the sensor unit 510. The determination as to whether or not the image is in focus and has proper exposure may be expressed as a determination as to whether or not blur is small, or whether or not there is a blown-out highlight and blocking shadow in the exposure. The subject for which the pose is determined, is, for example, a person, a pet, a bird, etc. The determination as to whether the pose is good may be executed by being compared with pre-registered thresholds or the like relating to a reference pose, an interval between the face and hand, etc.

Here, FIG. 10 illustrates, as a flowchart, an example of a determination process of determining whether or not a present image is suitable, according to the fourth embodiment. Referring to FIG. 10, the second determination process will be described. In step S601, the determination unit 120 analyzes the already recorded images which the provisional recording unit 310 stores. Then, in step S602 to step S605, based on the result of analysis, the determination unit 120 evaluates the relationship between the already recorded image and the present image, and determines whether or not the present image is suitable for a time-lapse candidate frame.

In step S602, the determination unit 120 determines whether or not a characteristic image part, such as a scene, has moved between the already recorded image and the present image. In step S603, the determination unit 120 determines whether or not a characteristic image part, such as a scene, has greatly changed between the already recorded image and the present image. In step S604, the determination unit 120 determines whether or not an output value of the sensor unit 510 has been changed by a specific operation between the already recorded image and the present image. In step S605, the determination unit 120 determines whether or not the pose or expression of a person has changed between the already recorded image and the present image. If it is determined that the present image satisfies any one of the conditions of step S602 to step S605, the second determination process proceeds to step S606. In step S606, the calculation circuit 100 selects the image as a time-lapse candidate frame, and allows the provisional recording unit 310 to store the image. Thereafter, the second determination process is terminated.

If it is determined that the present image fails to satisfy any one of the conditions of step S602 to S605, the second determination process is terminated, and the time-lapse movie generation process proceeds to step S406. At this time, the image is not selected as a time-lapse candidate frame.

The already recorded image which is analyzed in step S601 may be either an already selected time-lapse candidate frame, or an image included in the first image group. The determination unit 120 may analyze all of the already recorded images, or may analyze only some of the already recorded images. The already recorded image which is an object of analysis may be determined, for example, based on the range of time of acquisition, or may be determined based on the correlation between the already recorded image and the present image. The calculation circuit 100 may allow the provisional recording unit 310 to store the analysis result, and may use the analysis result for the next second determination process.

The movement of the characteristic image part, such as a scene, for example, is based on a movement of the subject, a movement of the imaging apparatus 1, etc. The great change of the characteristic image part, such as a scene, is a change with time of a characteristic such as a size or a color of the characteristic image part, regardless of the presence/absence of the movement of the imaging apparatus 1 or the characteristic. For example, the great change of the characteristic image part is a change at a time when fireworks have been set off, or when a bird has suddenly flown away. The specific operation includes, for example, a change of the direction of photography of the imaging apparatus 1, an acceleration/deceleration of the imaging apparatus 1, and a movement of the imaging apparatus 1 from indoors to outdoors and vice versa. For example, when the imaging apparatus 1 has rotated and has changed the direction of photography, the output value of a gyrosensor varies. In addition, when the imaging apparatus 1 has accelerated or decelerated, the output value of an acceleration sensor varies. Even when a movement has occurred from indoors to outdoors and vice versa, the determination unit 120 can detect the movement by detecting whether or not ambient light is natural light by using a luminance sensor, or can detect the movement by using a position sensor or map information. The change of the pose or expression of a person is, for example, a change at a time when the person has turned around, when the person has raised a hand, etc., the hand or the like, when the person has started crying, when the person has started laughing, or when the person has become angry.

In this manner, when a change has occurred in the image or in the sensor output value, there should have been an event which caused the change. Thus, the determination unit 120 detects this change, and determines the present image, i.e. the image after the change, to be suitable as the time-lapse candidate frame.

Figure 11:
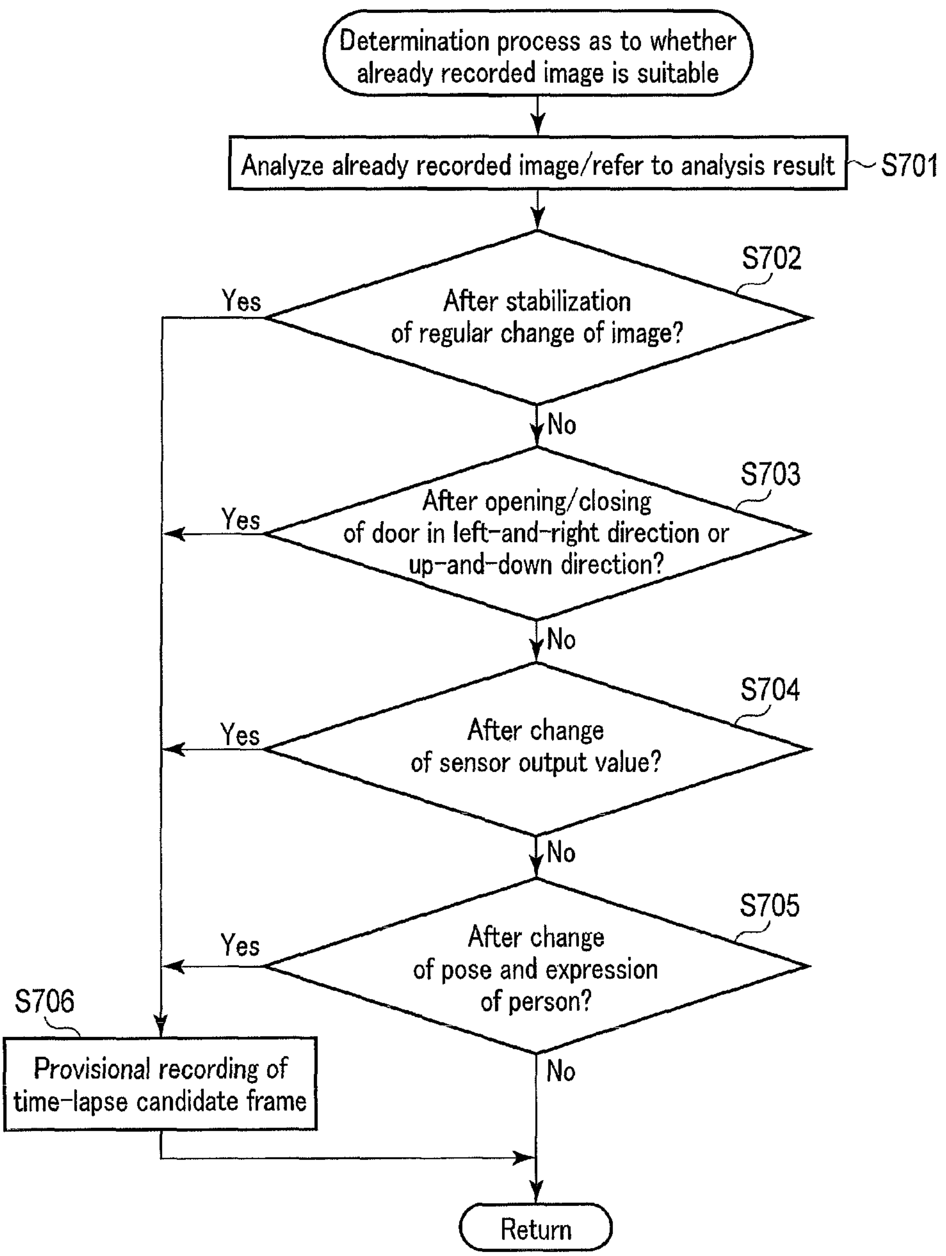
FIG. 11 is a flowchart illustrating an example of a determination process of determining whether or not an already recorded image is suitable, according to the fourth embodiment.

Here, FIG. 11 illustrates, as a flowchart, an example of the determination process of determining whether or not the already recorded image is suitable, according to the fourth embodiment. Referring to FIG. 11, the third determination process will be described. In step S701, the determination unit 120 analyzes the already recorded images which the provisional recording unit 310 stores. Then, in step S702 to step S705, based on the result of analysis, the determination unit 120 evaluates the relationship between the already recorded image and the present image, and determines whether the already recorded image is suitable as a time-lapse candidate frame.

In step S702, the determination unit 120 determines whether the image has stabilized after a change by a specific rule between the already recorded image and the present image. In step S703, the determination unit 120 determines whether a door has opened or closed in the left-and-right direction, in the up-and-down direction or in the front-and-back direction between the already recorded image and the present image. In step S704, the determination unit 120 determines whether the present time is after a change of the output value of the sensor unit 510 between the already recorded image and the present image. In step S705, the determination unit 120 determines whether the present time is after a change of the pose or expression of a person between the already recorded image and the present image. If it is determined that the already recorded image satisfies any one of the conditions of step S702 to step S705, the third determination process proceeds to step S706. In step S706, the calculation circuit 100 selects the image as a time-lapse candidate frame, and allows the provisional recording unit 310 to store the image. Thereafter, the third determination process is terminated.

If it is determined that the already recorded image fails to satisfy any one of the conditions of step S702 to S705, the third determination process is terminated, and the time-lapse movie generation process proceeds to step S408. At this time, the image is not selected as a time-lapse candidate frame.

The analysis of the already recorded image in step S701 is the same as in step S601. Here, the analysis result in step S601 that the provisional recording unit 310 stores, may be referred to. The determination in step S702 relates to, for example, a case in which a flying bird has stopped on a tree, a case of walking then stopping, or a case in which a change in brightness has stopped after gradually darkening such as at sunset. In the determination in step S703, for example, it is determined whether or not there is an entrance/exit in/from a building, or there is an entrance/exit in/from an elevator. This determination prevents the presence of the door from breaking the continuity or the characteristic of a story of the time-lapse movie. The determination in step S703 may be, for example, determining whether or not the present time is after such a change as to satisfy the determination condition in step S603 of the second determination process.

In this manner, when a change has occurred in the image or in the sensor output value, there should have been an event which caused the change. Thus, the determination unit 120 detects this change, and determines the already recorded image, i.e. the image before the change, to be suitable as the time-lapse candidate frame. Thereby, in combination with the second determination process, the imaging apparatus 1 acquires the images before and after the change as the time-lapse candidate frames, and it becomes possible to generate a time-lapse movie with a characteristic of a story. For example, in the case of a scene in which a person cries, their reason for crying becomes clear.

In the first determination process, it is described that the calculation circuit 100 selects the image as the time-lapse candidate frame if the image satisfies all conditions. However, for example, a score, such as an index of the degree of suitability to the time-lapse movie, may be given to the image with respect to each of the conditions. Based on this score, the determination may be executed. Similarly, it is described that the calculation circuit 100 selects the image as the time-lapse candidate frame if the present image satisfies any one of the conditions of step S602 to step S605 in the second determination process, and if the already recorded image satisfies any one of the conditions of step S702 to step S705 in the third determination process. However, the determination may be executed based on the degree of agreement to each determination condition of each image.

In the first determination process or second determination process, if there is no image which satisfies the condition and the time in which no time-lapse candidate frame is acquired continues, there is a possibility that a change in situation cannot be followed by the generated time-lapse movie. For example, even when the acquired image has no characteristic change, the determination unit 120 may select, based on a given interval setting, the image as a time-lapse candidate frame. As described above in the third embodiment, the image processing unit 180 may generate an image of the composition suitable for the subject by applying a trimming process or the like, and may determine whether this image is suitable for the time-lapse movie. Furthermore, for example, a method in which the degree of suitability of each image to a time-lapse candidate frame is expressed as a numerical value, and the image with the highest score during a specific time interval is selected as a time-lapse candidate frame can be considered. The thus selected time-lapse candidate frame is also selected by the fourth condition if a temporally successive similar frame appears.

In the selection of the playback method in step S122 of the imaging apparatus control process, the time-lapse movie, as well as the still image and movie, is selectable. The time-lapse movie may also be capable of being played back, even during the time-lapse movie generation process. In this case, even while the sequential shooting movie photography is being executed, the user can, for example, confirm and edit the time-lapse movie generated up to that time point, as necessary.

After the sequential shooting photography process in step S104 of the imaging apparatus control process, or when the first image group has already been provisionally recorded, the calculation circuit 100 may also not execute the processes of step S301 to step S309. In this case, the time-lapse movie generation process is successively executed on the still images included in the first image group. In addition, the time-lapse movie generation process may be executed based on the still image frame Fs, or may be executed based on the movie frame Fm. Specifically, the first image group may include any of the still image, still image frame Fs, and movie frame Fm, and the time-lapse movie generation process may execute determination and selection with respect to any of the images included in the first image group.

The calculation circuit 100 may further include an element which determines whether each of the images constituting the time-lapse movie, that is, each of the images selected as time-lapse movie frames, is suitable for the time-lapse movie. In addition, the calculation circuit 100 may include a frame change unit which changes the selected time-lapse candidate frame, in accordance with the result of this determination.

The imaging apparatus 1 according to the present embodiment has the following advantageous effect, in addition to the advantageous effects obtained by the first embodiment or second embodiment. If the imaging apparatus 1 according to the present embodiment is used, the user can start photography when a desired subject of photography has appeared. While the photography is being conducted, it is possible to simultaneously generate a movie composed of images suitable for movies, still images having characteristics suitable for still images, and a time-lapse movie which shows the outline of a movie photographed by properly capturing a subject or a change of the subject

[Modifications]

(Modifications Relating to Configuration of Imaging Apparatus)

The imaging apparatus 1 may further include an external operation device unit and a communication unit. The external operation device unit may include an external operation unit having the same function as the operation unit 410, an external display having the same function as the display 420, and an external communication unit. The external operation device unit may be a terminal with a communication function, such as a tablet-type personal computer, a smartphone, and various kinds of wearable terminals. A plurality of such terminals may be prepared, or communication with the communication unit can be executed remotely via the Internet or the like.

(Modifications Relating to Examples of Use of Imaging Apparatus)

The techniques relating to the above-described embodiments are applicable to, for example, fixed-point observation cameras or the like, such as cameras or monitor cameras, which are used by being attached to vehicles such as an automobile or a bicycle, user's clothes or helmets, and observation equipment such as a CanSat or a balloon. If the imaging apparatus 1 is used in such a manner that the sequential shooting movie photography process is started in accordance with detection or a change of the subject, it is possible to easily and simultaneously acquire a movie which is recorded over a long time, and a still image with proper image quality, which is recorded when a change occurred in the movie.

The present techniques enable movie-like representation and still-image-like representation to mixedly present in a specific photography situation. Thus, under the present techniques, continuous images, which have good visual quality, are easy to observe, and are good in responsivity, and evidence images, which are perfectly motionless and are available as evidence, are compatible. Accordingly, for example, the present techniques may be used, for example, in an endoscope or a capsule-type endoscope, and, while the visibility and observation characteristics are improved by a movie-like response, images may be obtained which are good for examination in detail when the images are stopped, or the techniques may be used in various observation devices and analysis devices for academic uses, industrial uses, or clinical uses. For example, a specific result is obtained after a long time in the case of progress confirmation of cell-level biological activities such as cell division or generation of virus antibodies, or progress confirmation of the growth and ecology of an individual-level living thing such as a hatching and emergence of butterflies. However, in many cases, it is unclear when a phenomenon or a change occurs. In addition, there is a case in which simultaneous acquisition of a movie and a still image is desired, for example, with respect to a phenomenon with a low frequency of occurrence. Accordingly, either a hobby, or for research and education, there is a demand for recording a scene, in which a phenomenon or a change has occurred, by both a still image with proper image quality and the movie, and this is achieved by the techniques of the embodiments. The situation of photography may be determined by an image or a scene. However, the situation of photography may also be determined in consideration of the user's taste, based on specific operations or biological information. The specific photography situation may include a case of coping with a quickly moving subject, a case of quick photography, or a case of photography conducted in an unstable setting, etc. Also, in the present techniques, a short-time exposure and a long-time exposure may not merely be mixed, an auxiliary control to adjust the exposure in conjunction with illumination light may also be executed.

There is also a demand for the acquisition of the time-lapse movie which is composed of still images having the proper image quality, composition, etc., and this is achieved by the present techniques. For example, in the above-described situation, the present techniques can easily generate the time-lapse movie which enables viewing of the outline of the state of the subject. Such a time-lapse movie can also be used as an example of the expression of a research result, for example, in a presentation, etc.

The order of the respective processes and the respective steps in the processes illustrated in the flowcharts can be changed, and processes and steps can be added or deleted. These processes are executed by respective programs recorded on the recording unit 320. The respective programs may be pre-recorded on the imaging apparatus 1, or may be recorded on other recording media. There are various methods of recording programs in the imaging apparatus 1 or other recording media. The programs may be recorded at a time of product shipment, may be recorded with use of distributed recording media, or may be recorded with use of communication networks such as the Internet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:

an imager configured to generate an image using a set exposure time; and at least one circuit configured to:

detect a specific photography situation based on an output from a sensor, wherein the sensor measures an orientation of the imager, start a sequential shooting movie photography mode when the specific photography situation is detected, the sequential shooting movie photography mode including:

setting an exposure time for acquiring a movie frame based on a subject luminance of an entirety of a field angle and setting a first exposure time for acquiring a still image frame based on a subject luminance of a subject of interest at predetermined timings;

setting, a difference between the exposure time for acquiring a movie frame and the first exposure time as a second exposure time for acquiring a complementary frame;

generating a still image, based on the still image frame generated by photography with the first exposure time; and generating the movie frame constituting a movie, by composing the still image frame and the complementary frame generated by photography with the second exposure time;

determine whether the still image generated in the sequential shooting movie photography mode includes the subject of interest;

determine, when the subject of interest is detected, whether the still image includes a composition for photographing that is suitable for the subject of interest and suitable for playback or appreciation;

select the still image determined as including the composition for photographing that is suitable for the subject of interest and suitable for playback or appreciation;

determine whether the selected still image is suitable for a time lapse movie based on whether at least one of a characteristic of the still image, a position of the characteristic on the still image, the output from the sensor, and a pose or expression of the subject of interest if the subject of interest is a person, has changed; and generate a time lapse movie frame constituting a time lapse movie from the still image that is determined to be suitable.

2. The imaging apparatus according to claim 1, wherein the at least one circuit is configured to apply different image processes to the still image and the movie frame.

3. The imaging apparatus according to claim 1, wherein the sensor is configured to detect a movement of a housing of the imaging apparatus; and wherein the at least one circuit is configured to determine whether the specific photography situation occurs, based on the output from the sensor.

4. The imaging apparatus according to claim 1, wherein the at least one circuit is configured to set a plurality of first exposure times, and to cause the imager to execute imaging at each of the predetermined timings with use of the first exposure times that are different.

5. The imaging apparatus according to claim 1, wherein the at least one circuit is further configured to:

crop a part of the still image which is determined to not have the composition for photographing suitable for the subject of interest and suitable for playback and appreciation, thereby generating a still image having the composition for photographing suitable for the subject of interest and suitable for playback or appreciation, and select the generated still image.

6. An imaging method comprising:

detecting a specific photography situation based on an output from a sensor, wherein the sensor measures an orientation of the imager;

starting a sequential shooting movie photography mode when the specific photography is detected, the sequential shooting movie photography mode including:

setting an exposure time for acquiring a movie frame based on a subject luminance of an entirety of a field angle and a first exposure time for acquiring a still image frame based on a subject luminance of a subject of interest at predetermined timings;

setting a difference between the exposure time for acquiring a movie frame and the first exposure time as a second exposure time for acquiring a complementary frame;

executing imaging with use of the first exposure time and the second exposure time at each of the predetermined timings;

generating a still image, based on the still image frame generated by photography with the first exposure time; and generating the movie frame constituting a movie, by composing the still image frame and the complementary frame generated by photography with the second exposure time determining whether the still image generated in the sequential shooting movie photography mode includes the subject of interest;

determining, when the subject of interest is detected, whether the still image includes a composition for photographing that is suitable for the subject of interest and suitable for playback or appreciation; and selecting, as a still image to be recorded, the still image determined as including the composition for photographing that is suitable for the subject of interest and suitable for playback or appreciation.

7. The imaging method according to claim 6, further comprising:

determining whether the selected still image is suitable for a time lapse movie based on whether at least one of a characteristic of the still image, a position of the characteristic on the still image, the output from the sensor in accordance with a specific operation, and a pose or expression of the subject of interest if the subject of interest is a person, has changed; and generating a time lapse movie frame constituting the time lapse movie from the still image that is determined to be suitable.

8. An imaging apparatus comprising:

an imager configured to generate an image using a set exposure time; and at least one circuit configured to:

detect a specific photography situation based on an output from a sensor, wherein the sensor measures an orientation of the imager, start a sequential shooting movie photography mode when the specific photography situation is detected, the sequential shooting movie photography mode including:

setting an exposure time for acquiring a movie frame based on a subject luminance of an entirety of a field angle and setting a first exposure time for acquiring a still image frame based on a subject luminance of a subject of interest at predetermined timings;

setting a difference between the exposure time for acquiring a movie frame and the first exposure time as a second exposure time for acquiring a complementary frame;

generating a still image, based on the still image frame generated by photography with the first exposure time; and generating the movie frame constituting a movie, by composing the still image frame and a complimentary frame generated by photography with the second exposure time;

determine whether the still image generated in the sequential shooting movie photography mode includes the subject of interest;

determine, when the subject of interest is detected, whether the still image includes a composition for photographing that is suitable for the subject of interest and suitable for playback or appreciation; and select, as a still image to be recorded, the still image determined as including the composition for photographing that is suitable for the subject of interest and suitable for playback or appreciation.

9. The imaging apparatus according to claim 8, wherein the at least one circuit is configured to apply different image processes to the still image and the movie frame.

10. The imaging apparatus according to claim 8, wherein the sensor is configured to detect a movement of a housing of the imaging apparatus.

11. The imaging apparatus according to claim 8, wherein the at least one circuit is further configured to:

set a plurality of first exposure times, and cause the imager to execute imaging at each of the predetermined timings with use of the first exposure times that are different.

12. The imaging apparatus according to claim 8, wherein the at least one circuit is further configured to:

crop a part of the still image which is determined to not have the composition for photographing suitable for the subject of interest and suitable for playback or appreciation, thereby generating a still image having the composition for photographing suitable for the subject of interest and suitable for playback or appreciation, and select the generated still image.

13. The imaging apparatus according to claim 8, wherein the at least one circuit is further configured to:

determine whether the selected still image is suitable for a time-lapse movie, and generate a time-lapse movie frame constituting a time lapse movie from the still image that is determined to be suitable.

* * * * *